US011800496B2

(12) United States Patent
Venugopal et al.

(10) Patent No.: US 11,800,496 B2
(45) Date of Patent: Oct. 24, 2023

(54) TRACKING REFERENCE SIGNAL CONFIGURATION FOR SINGLE FREQUENCY NETWORK COMMUNICATIONS

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/481,062

(22) Filed: Sep. 21, 2021

(65) Prior Publication Data

US 2023/0088488 A1 Mar. 23, 2023

(51) Int. Cl.
*H04W 72/044* (2023.01)
*H04L 25/02* (2006.01)
(Continued)

(52) U.S. Cl.
CPC ......... *H04W 72/044* (2013.01); *H04L 5/0048* (2013.01); *H04L 25/0224* (2013.01); *H04W 72/51* (2023.01)

(58) Field of Classification Search
CPC ... H04L 5/0035; H04L 5/0048; H04L 5/0094; H04L 25/0224; H04W 72/044;
(Continued)

(56) References Cited

U.S. PATENT DOCUMENTS

| 2020/0373985 | A1* | 11/2020 | Tsai | H04L 5/0057 |
| 2022/0338227 | A1* | 10/2022 | Cirik | H04W 72/53 |

(Continued)

FOREIGN PATENT DOCUMENTS

| EP | 3993280 A2 | 5/2022 |
| WO | WO-2021159470 A1 | 8/2021 |

(Continued)

OTHER PUBLICATIONS

International Search Report and Written Opinion—PCT/US2022/041558—ISA/EPO—dated Mar. 20, 2023.
(Continued)

*Primary Examiner* — Pao Sinkantarakorn
(74) *Attorney, Agent, or Firm* — Holland & Hart LLP

(57) ABSTRACT

Methods, systems, and devices for wireless communications are described. A user equipment (UE) may receive a control message indicating a resource set that includes one or more resources or a resource configuration for two or more time resources for reference signal reception from at least two transmission/reception points (TRPs) in accordance with a single frequency network (SFN) configuration. The UE may receive a first reference signal from the first TRP and a second reference from the second TRP in the indicated resources. The UE may perform a channel estimation for an SFN channel associated with the at least two TRPs in accordance with the control message. The channel estimation may be based on the first and second reference signals. The UE may communicate with at least one of the first TRP and the second TRP in accordance with the channel estimation.

30 Claims, 21 Drawing Sheets

(51) Int. Cl.
*H04L 5/00* (2006.01)
*H04W 72/51* (2023.01)

(58) Field of Classification Search
CPC ............. H04W 72/0453; H04W 72/23; H04W 72/231; H04W 72/232; H04W 72/51; H04W 72/535
See application file for complete search history.

(56) References Cited

U.S. PATENT DOCUMENTS

| | | | | |
|---|---|---|---|---|
| 2022/0376876 | A1* | 11/2022 | Song | H04L 5/0091 |
| 2023/0064231 | A1* | 3/2023 | Haghighat | H04W 72/23 |
| 2023/0136240 | A1* | 5/2023 | Zhu | H04L 5/0048 |
| | | | | 370/329 |

FOREIGN PATENT DOCUMENTS

| | | | |
|---|---|---|---|
| WO | WO-2021163508 | A1 | 8/2021 |
| WO | WO-2021183662 | A1 | 9/2021 |

OTHER PUBLICATIONS

Partial International Search Report—PCT/US2022/041558—ISA/EPO—dated Dec. 19, 2022.

Qualcomm Incorporated: "Enhancements on HST-SFN Deployment", 3GPP TSG-RAN WG1 Meeting #104bis-e, R1-2103154, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 35 Pages, Apr. 7, 2021, XP052177954, Section 3.4.

Samsung: "Enhancements on HST-SFN", 3GPP TSG RAN WG1 #104b-e, R1-2103225, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 9 Pages, Apr. 7, 2021, XP052178004, p. 5.

Sony: "Considerations on HST-SFN Operation for Multi-TRP", 3GPP TSG RAN WG1#104bis, R1-2103291, 3rd Generation Partnership Project, Mobile Competence Centre, 650, Route Des Lucioles, F-06921 Sophia-Antipolis Cedex, France, vol. RAN WG1, No. E-Meeting, Apr. 12, 2021-Apr. 20, 2021, 7 Pages, Apr. 7, 2021, XP052178058, Section 2.3.

* cited by examiner

TRACKING REFERENCE SIGNAL CONFIGURATION FOR SINGLE FREQUENCY NETWORK COMMUNICATIONS

INTRODUCTION

The following relates generally to wireless communications, and more specifically to single frequency network (SFN) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include transmitting a UE capability message indicating support for an SFN configuration and receiving a control message based on the UE capability message. In some examples, the control message may indicate a resource set that includes one or more resources for reference signal reception from at least two transmission/reception points (TRPs) in accordance with the SFN configuration, the at least two TRPs including a first TRP and a second TRP. In some examples, the method may include performing a channel estimation for an SFN channel associated with the at least two TRPs in accordance with the control message, the channel estimation based on a first reference signal of the first TRP and a second reference signal of the second TRP received in the one or more resources and communicating with at least one of the first TRP or the second TRP in accordance with the channel estimation.

An apparatus for wireless communications at a UE is described. The apparatus may include a processor and memory coupled with the processor. The processor and memory may be configured to transmit a UE capability message indicating support for an SFN configuration and receive a control message based on the UE capability message. In some examples, the control message may indicate a resource set that includes one or more resources for reference signal reception from at least two TRPs in accordance with the SFN configuration, the at least two TRPs including a first TRP and a second TRP. In some examples, the processor and memory may be configured to perform a channel estimation for an SFN channel associated with the at least two TRPs in accordance with the control message, the channel estimation based on a first reference signal of the first TRP and a second reference signal of the second TRP received in the one or more resources and communicate with at least one of the first TRP or the second TRP in accordance with the channel estimation.

Another apparatus for wireless communications at a UE is described. The apparatus may include means for transmitting a UE capability message indicating support for an SFN configuration and means for receiving a control message based on the UE capability message. In some examples, the control message may indicate a resource set that includes one or more resources for reference signal reception from at least two TRPs in accordance with the SFN configuration, the at least two TRPs including a first TRP and a second TRP. In some examples, the apparatus may include means for performing a channel estimation for an SFN channel associated with the at least two TRPs in accordance with the control message, the channel estimation based on a first reference signal of the first TRP and a second reference signal of the second TRP received in the one or more resources and means for communicating with at least one of the first TRP or the second TRP in accordance with the channel estimation.

A non-transitory computer-readable medium storing code for wireless communications at a UE is described. The code may include instructions executable by a processor to transmit a UE capability message indicating support for an SFN configuration and receive a control message based on the UE capability message. In some examples, the control message may indicate a resource set that includes one or more resources for reference signal reception from at least two TRPs in accordance with the SFN configuration, the at least two TRPs including a first TRP and a second TRP. In some examples, the code may include instructions executable by a processor to perform a channel estimation for an SFN channel associated with the at least two TRPs in accordance with the control message, the channel estimation based on a first reference signal of the first TRP and a second reference signal of the second TRP received in the one or more resources and communicate with at least one of the first TRP or the second TRP in accordance with the channel estimation.

Some examples of the method, apparatuses, and non-transitory computer-readable medium described herein may further include operations, features, means, or instructions for receiving the first reference signal and the second reference signal in the one or more resources. In some examples, the one or more resources may include a first time resource associated with the first TRP and a second time resource associated with the second TRP, where the first time resource and the second time resource may be overlapping in a time domain.

Some examples of the method, apparatuses, and non-transitory computer-readable medium described herein may further include operations, features, means, or instructions for receiving the first reference signal in the first time resource and a first resource element, the first reference signal scrambled according to a first scrambling sequence associated with a first identifier (ID) of the first TRP. Some examples of the method, apparatuses, and non-transitory computer-readable medium described herein may further include operations, features, means, or instructions for receiving the second reference signal in the second time resource and the first resource element, the second reference signal scrambled according to a second scrambling sequence associated with a second ID of the second TRP.

Some examples of the method, apparatuses, and non-transitory computer-readable medium described herein may further include operations, features, means, or instructions for receiving the first reference signal in the first time resource and a first resource element and receiving the second reference signal in the second time resource and a second resource element that may be nonoverlapping with the first resource element in a frequency domain. In some examples, the first reference signal and the second reference signal may be transmitted according to a frequency division multiplexing (FDM) or a spatial division multiplexing (SDM) configuration.

In some examples of the method, apparatuses, and non-transitory computer-readable medium described herein, the resource set may include a first resource set associated with the first TRP and a second resource set associated with the second TRP, and the method, apparatuses, and non-transitory computer-readable medium may include further operations, features, means, or instructions for performing the channel estimation for the SFN channel based on the first reference signal being received via the first resource set. In some examples, the second reference signal may be received via the second resource set, and the first resource set may correspond to a same periodicity, a same offset, or both, as the second resource set.

In some examples of the method, apparatuses, and non-transitory computer-readable medium described herein, the resource set may include a first resource set associated with the first TRP and a second resource set associated with the second TRP, and the method, apparatuses, and non-transitory computer-readable medium may include further operations, features, means, or instructions for receiving a first downlink control channel scheduling the first reference signal via the first resource set and a second downlink control channel scheduling the second reference signal via the second resource set. Some examples of the method, apparatuses, and non-transitory computer-readable medium described herein may further include operations, features, means, or instructions for performing the channel estimation for the SFN channel based on the first reference signal being received in a first time resource of the first resource set and the second reference signal being received in a second time resource of the second resource set that may be overlapping with the first time resource in a time domain.

In some examples of the method, apparatuses, and non-transitory computer-readable medium described herein, the UE capability message includes a field configured to indicate a UE capability to receive reference signals from the at least two TRPs in a same time resource in accordance with the SFN configuration.

In some examples of the method, apparatuses, and non-transitory computer-readable medium described herein, the UE capability message comprises one or more fields different than the field, the one or more fields indicating support for a multi-TRP communications configuration via a downlink control channel or a downlink shared channel.

Some examples of the method, apparatuses, and non-transitory computer-readable medium described herein may further include operations, features, means, or instructions for receiving the first reference signal via a first symbol and a first resource element and receiving the second reference signal via the first symbol and a second resource element, where the one or more resources includes the first symbol, the first resource element, and the second resource element. Some examples of the method, apparatuses, and non-transitory computer-readable medium described herein may further include operations, features, means, or instructions for transmitting the UE capability message indicating support for the SFN configuration based on a frequency offset between the first resource element and the second resource element.

A method for wireless communications at a UE is described. The method may include receiving a control message indicating a resource configuration for two or more time resources associated with reference signal reception from at least two TRPs in accordance with an SFN configuration and receiving, via the two or more time resources, a first reference signal from a first TRP of the at least two TRPs and a second reference signal from a second TRP of the at least two TRPs based on the resource configuration. In some examples, the method may include performing a channel estimation for an SFN channel associated with the first TRP and the second TRP in accordance with the control message, the channel estimation based on the first reference signal and the second reference signal. In some examples, the method may include communicating with at least one of the first TRP or the second TRP in accordance with the channel estimation.

An apparatus for wireless communications at a UE is described. The apparatus may include a processor and memory coupled with the processor. The processor and memory may be configured to receive a control message indicating a resource configuration for two or more time resources associated with reference signal reception from at least two TRPs in accordance with an SFN configuration and receive, via the two or more time resources, a first reference signal from a first TRP of the at least two TRPs and a second reference signal from a second TRP of the at least two TRPs based on the resource configuration. In some examples, the processor and memory may be configured to perform a channel estimation for an SFN channel associated with the first TRP and the second TRP in accordance with the control message, the channel estimation based on the first reference signal and the second reference signal. In some examples, the processor and memory may be configured to communicate with at least one of the first TRP or the second TRP in accordance with the channel estimation.

Another apparatus for wireless communications at a UE is described. The apparatus may include means for receiving a control message indicating a resource configuration for two or more time resources associated with reference signal reception from at least two TRPs in accordance with an SFN configuration and means for receiving, via the two or more time resources, a first reference signal from a first TRP of the at least two TRPs and a second reference signal from a second TRP of the at least two TRPs based on the resource configuration. In some examples, the apparatus may include means for performing a channel estimation for an SFN channel associated with the first TRP and the second TRP in accordance with the control message, the channel estimation based on the first reference signal and the second reference signal. In some examples, the apparatus may include means for communicating with at least one of the first TRP or the second TRP in accordance with the channel estimation.

A non-transitory computer-readable medium storing code for wireless communications at a UE is described. The code may include instructions executable by a processor to receive a control message indicating a resource configuration for two or more time resources associated with reference signal reception from at least two TRPs in accordance with an SFN configuration and receive, via the two or more time resources, a first reference signal from a first TRP of the at least two TRPs and a second reference signal from a second TRP of the at least two TRPs based on the resource configuration. In some examples, the code may include instructions executable by the processor to perform a channel estimation for an SFN channel associated with the first TRP and the second TRP in accordance with the control message, the channel estimation based on the first reference signal and the second reference signal. In some examples, the code may include instructions executable by the processor to communicate with at least one of the first TRP or the second TRP in accordance with the channel estimation.

In some examples of the method, apparatuses, and non-transitory computer-readable medium described herein, the control message may indicate a window associated with the two or more time resources, and the method, apparatuses, and non-transitory computer-readable medium may include further operations, features, means, or instructions for performing the channel estimation for the SFN channel based on the two or more time resources being located within the window. In some examples, the two or more time resources may include a first time resource associated with the first TRP and a second time resource associated with the second TRP.

In some examples of the method, apparatuses, and non-transitory computer-readable medium described herein, the control message indicates a starting boundary of the window relative to a location of the two or more time resources in a time domain.

Some examples of the method, apparatuses, and non-transitory computer-readable medium described herein may further include operations, features, means, or instructions for receiving the control message via a downlink control channel, the control message indicating a starting boundary of the window relative to a last symbol of the downlink control channel in a time domain.

Some examples of the method, apparatuses, and non-transitory computer-readable medium described herein may further include operations, features, means, or instructions for maintaining a first receiver chain associated with the first TRP and a second receiver chain associated with the second TRP. In some examples, the first receiver chain may correspond to a first refresh interval and the second receiver chain may correspond to a second refresh interval, where a duration of the window may be less than a duration of the first refresh interval and a duration of the second refresh interval.

Some examples of the method, apparatuses, and non-transitory computer-readable medium described herein may further include operations, features, means, or instructions for performing a beam switch during a beam switch duration between reception of the first reference signal and reception of the second reference signal. In some examples, a duration of the window may be greater than the beam switch duration.

In some examples of the method, apparatuses, and non-transitory computer-readable medium described herein, the window includes one or more resource sets associated with the two or more time resources. In some examples, the one or more resource sets may be based on the control message, a periodicity of the two or more time resources, an offset, a capability of the UE, or any combination thereof.

Some examples of the method, apparatuses, and non-transitory computer-readable medium described herein may further include operations, features, means, or instructions for receiving a radio resource control (RRC) signal indicating a configuration for the window.

In some examples of the method, apparatuses, and non-transitory computer-readable medium described herein, the resource configuration indicates a resource set including a first subset of resources associated with the first TRP and a second subset of resources associated with the second TRP.

In some examples, the control message may indicate joint tracking between the first subset of resources and the second subset of resources.

Some examples of the method, apparatuses, and non-transitory computer-readable medium described herein may further include operations, features, means, or instructions for receiving a second control message indicating separate tracking between the first subset of resources and the second subset of resources. Some examples of the method, apparatuses, and non-transitory computer-readable medium described herein may further include operations, features, means, or instructions for performing a first channel estimation for a first channel associated with the first TRP in accordance with the second control message and performing a second channel estimation for a second channel associated with the second TRP in accordance with the second control message.

Some examples of the method, apparatuses, and non-transitory computer-readable medium described herein may further include operations, features, means, or instructions for receiving a control signal indicating a pairing between a first resource set associated with the first TRP and a second resource set associated with the second TRP and performing the channel estimation for the SFN channel based on the control signal.

Some examples of the method, apparatuses, and non-transitory computer-readable medium described herein may further include operations, features, means, or instructions for receiving the first reference signal via a first time resource of the two or more time resources and receiving the second reference signal via a second time resource of the two or more time resources that may be non-overlapping with the first time resource. In some examples, the first reference signal and the second reference signal may be transmitted according to a time division multiplexing (TDM) configuration.

A method for wireless communications at a network node including at least two TRPs is described. The method may include receiving, from a UE, a UE capability message indicating support for an SFN configuration and transmitting, to the UE, a control message based on the UE capability message. In some examples, the control message may indicate a resource set that includes one or more resources for reference signal transmission from the at least two TRPs in accordance with the SFN configuration, the at least two TRPs including a first TRP and a second TRP. In some examples, the method may include transmitting, to the UE in the one or more resources, a first reference signal of the first TRP and a second reference signal of the second TRP and communicating with the UE using at least one of the first TRP and the second TRP in accordance with an SFN channel associated with the at least two TRPs.

An apparatus for wireless communications at a network node including at least two TRPs is described. The apparatus may include a processor and memory coupled with the processor. The processor and memory may be configured to receive, from a UE, a UE capability message indicating support for an SFN configuration and transmit, to the UE, a control message based on the UE capability message. In some examples, the control message may indicate a resource set that includes one or more resources for reference signal transmission from the at least two TRPs in accordance with the SFN configuration, the at least two TRPs including a first TRP and a second TRP. In some examples, the processor and memory may be configured to transmit, to the UE in the one or more resources, a first reference signal of the first TRP and a second reference signal of the second TRP and communicate with the UE using at least one of the first TRP and the second TRP in accordance with an SFN channel associated with the at least two TRPs.

Another apparatus for wireless communications at a network node including at least two TRPs is described. The apparatus may include means for receiving, from a UE, a UE capability message indicating support for an SFN configuration and means for transmitting, to the UE, a control message based on the UE capability message. In some examples, the control message may indicate a resource set that includes one or more resources for reference signal transmission from the at least two TRPs in accordance with the SFN configuration, the at least two TRPs including a first TRP and a second TRP. In some examples, the apparatus may include means for transmitting, to the UE in the one or more resources, a first reference signal of the first TRP and a second reference signal of the second TRP and means for communicating with the UE using at least one of the first TRP and the second TRP in accordance with an SFN channel associated with the at least two TRPs.

A non-transitory computer-readable medium storing code for wireless communications at a network node including at least two TRPs is described. The code may include instructions executable by a processor to receive, from a UE, a UE capability message indicating support for an SFN configuration and transmit, to the UE, a control message based on the UE capability message. In some examples, the control message may indicate a resource set that includes one or more resources for reference signal transmission from the at least two TRPs in accordance with the SFN configuration, the at least two TRPs including a first TRP and a second TRP. In some examples, the code may include instructions executable by a processor to transmit, to the UE in the one or more resources, a first reference signal of the first TRP and a second reference signal of the second TRP and communicate with the UE using at least one of the first TRP and the second TRP in accordance with an SFN channel associated with the at least two TRPs.

Some examples of the method, apparatuses, and non-transitory computer-readable medium described herein may further include operations, features, means, or instructions for transmitting the first reference signal and the second reference signal to the UE in the one or more resources. In some examples, the one or more resources may include a first time resource associated with the first TRP and a second time resource associated with the second TRP, where the first time resource and the second time resource may be overlapping in a time domain.

Some examples of the method, apparatuses, and non-transitory computer-readable medium described herein may further include operations, features, means, or instructions for transmitting the first reference signal in the first time resource and a first resource element, the first reference signal scrambled according to a first scrambling sequence associated with the first TRP and transmitting the second reference signal in the second time resource and the first resource element, the second reference signal scrambled according to a second scrambling sequence associated with the second TRP. In some examples, the first time resource and the second time resource may correspond to a same symbol.

Some examples of the method, apparatuses, and non-transitory computer-readable medium described herein may further include operations, features, means, or instructions for transmitting the first reference signal in the first time resource and a first resource element and transmitting the second reference signal in the second time resource and a second resource element that may be nonoverlapping with the first resource element in a frequency domain. In some examples, the first time resource and the second time resource may correspond to a same symbol, where the first reference signal and the second reference signal may be transmitted according to an FDM or an SDM configuration.

A method for wireless communications at a network node including at least two TRPs is described. The method may include transmitting, to a UE, a control message indicating a resource configuration for two or more time resources associated with reference signal transmission for the at least two TRPs in accordance with an SFN configuration and transmitting, to the UE via the two or more time resources, a first reference signal from a first TRP of the at least two TRPs and a second reference signal from a second TRP of the at least two TRPs based on the resource configuration. In some examples, the method may include communicating with the UE using at least one of the first TRP and the second TRP in accordance with the SFN configuration.

An apparatus for wireless communications at a network node including at least two TRPs is described. The apparatus may include a processor and memory coupled with the processor. The processor and memory may be configured to transmit, to a UE, a control message indicating a resource configuration for two or more time resources associated with reference signal transmission for the at least two TRPs in accordance with an SFN configuration and transmit, to the UE via the two or more time resources, a first reference signal from a first TRP of the at least two TRPs and a second reference signal from a second TRP of the at least two TRPs based on the resource configuration. In some examples, the processor and memory may be configured to communicate with the UE using at least one of the first TRP and the second TRP in accordance with the SFN configuration.

Another apparatus for wireless communications at a network node including at least two TRPs is described. The apparatus may include means for transmitting, to a UE, a control message indicating a resource configuration for two or more time resources associated with reference signal transmission for the at least two TRPs in accordance with an SFN configuration and means for transmitting, to the UE via the two or more time resources, a first reference signal from a first TRP of the at least two TRPs and a second reference signal from a second TRP of the at least two TRPs based on the resource configuration. In some examples, the apparatus may include means for communicating with the UE using at least one of the first TRP and the second TRP in accordance with the SFN configuration.

A non-transitory computer-readable medium storing code for wireless communications at a network node including at least two TRPs is described. The code may include instructions executable by a processor to transmit, to a UE, a control message indicating a resource configuration for two or more time resources associated with reference signal transmission for the at least two TRPs in accordance with an SFN configuration and transmit, to the UE via the two or more time resources, a first reference signal from a first TRP of the at least two TRPs and a second reference signal from a second TRP of the at least two TRPs based on the resource configuration. In some examples, the code may include instructions executable by the processor to communicate with the UE using at least one of the first TRP and the second TRP in accordance with the SFN configuration.

In some examples of the method, apparatuses, and non-transitory computer-readable medium described herein, the control message indicates a window associated with the two or more time resources.

In some examples of the method, apparatuses, and non-transitory computer-readable medium described herein, the control message indicates a starting boundary of the window relative to a location of the two or more time resources in a time domain.

Some examples of the method, apparatuses, and non-transitory computer-readable medium described herein may further include operations, features, means, or instructions for transmitting the control message via a downlink control channel. In some examples, the control message may indicate a starting boundary of the window relative to a last symbol of the downlink control channel in a time domain.

In some examples of the method, apparatuses, and non-transitory computer-readable medium described herein, a duration of the window may be greater than a beam switch duration associated with a beam switch performed by the UE.

DETAILED DESCRIPTION

Figure 1:
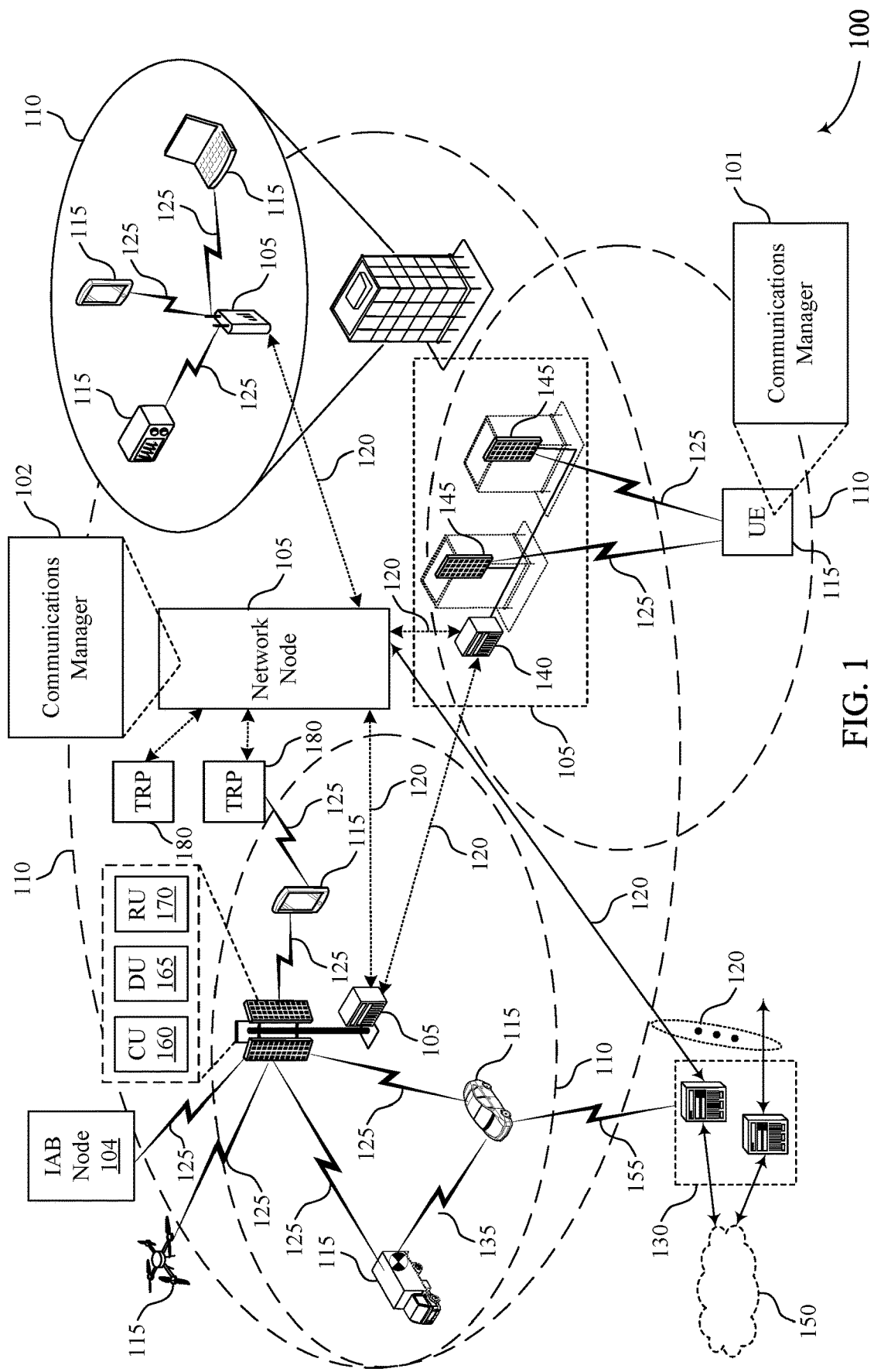
FIG. 1 illustrates an example of a wireless communications system that supports tracking reference signal (TRS) configuration for SFN communications in accordance with one or more aspects of the present disclosure.

A wireless communications system may include communication devices, such as a base station (e.g., an eNodeB (eNB), a next-generation NodeB or a giga-NodeB, any of which may be referred to as a gNB, or some other base station) or a UE that may support multiple radio access technologies. Examples of radio access technologies include 4G systems, such as LTE systems, and 5G systems, which may be referred to as NR systems. In some systems, a UE may communicate with the network via a network node, which may be an example of a control node, a base station, a TRP, or some other network entity. The network node may include or be in communication with one or more access network transmission entities to use for communication with a UE or other device, such as TRPs (which may also be referred to as radio heads). The network node may transmit or relay data or control signaling to one or more UEs via the TRPs, which may be included in or in communication with the network node. The network node may communicate with the UE according to a multi-TRP configuration, an SFN configuration, or a non-SFN configuration. In a multi-TRP configuration, the network node may send signals to the UE via multiple TRPs. In a non-SFN configuration, the network node may communicate with the UE using one or more TRPs. The signals communicated according to the multi-TRP configuration or the non-SFN configuration may each include different information and may not be synchronized in time or frequency.

In some examples, to improve communication reliability, the wireless communications system may support an SFN configuration, in which one or more TRPs of the network may transmit a same signal to the UE in a synchronized manner (e.g., in a same time resource, frequency resource, or both). In an SFN configuration, each TRP may transmit a reference signal (e.g., TRS, channel state information reference signal (CSI-RS), etc.) to the UE via a respective channel. The UE may measure a channel (e.g., for time or frequency tracking) between the UE and each TRP based on the respective reference signal. The UE may estimate an SFN channel (which may be referred to as a joint SFN channel or a combined SFN channel) that includes a combination of each channel between the UE and each TRP in communication with the UE. The UE may estimate the combined SFN channel based on each channel measurement performed by the UE. However, in some cases, reference signals from multiple TRPs in an SFN configuration may be synchronized in time but transmitted in different frequency resources or may be synchronized in frequency but transmitted in different time resources. In such cases, the UE may be unable to accurately measure the combined SFN channel based on the separate reference signals. Additionally, or alternatively, in some cases, signaling may not be defined to indicate, to the UE, which reference signals or channels to use for measuring the SFN channel, which may result in ambiguity or reduced reliability associated with SFN communications.

A network node as described herein may transmit, to a UE, an indication of a resource configuration for reference signal transmissions from two or more TRPs of the network node in accordance with an SFN configuration. The resource configuration may, in some examples, be referred to as a TRS configuration for SFN communications. In some examples, the reference signal transmissions may include TRS transmissions (e.g., reference signals used for time and frequency tracking of a device, such as the UE), CSI-RS transmissions, or both. The resource configuration may indicate a pairing between reference signals (e.g., TRS, CSI-RS), resources, or both associated with different TRPs of the network node. The UE may determine, based on the resource configuration, which reference signals to use for estimating a combined SFN channel associated with two or more TRPs. In some examples, the UE may transmit a UE capability message to indicate a capability of the UE to receive reference signals from different TRPs in a same time resource, such as a symbol, and the network node may transmit a control message that configures a resource set for reception of reference signals from two or more TRPs based on the UE capability message. If the UE receives a first reference signal and a second reference signal from a first and second TRP, respectively, in the resource set, the UE may track the reference signals together in order to perform a channel estimation for a combined SFN channel.

Additionally, or alternatively, the network node may transmit a control message that indicates two or more time resources associated with reference signals such as TRSs or CSI-RSs received from different TRPs. The control message may indicate a relationship or window associated with the two or more resources. The UE may receive a first reference signal from a first TRP and a second reference signal from a second TRP in the two or more time resources. The UE may track the first and second reference signals together (e.g., for estimating a combined SFN channel associated with the first and second TRPs) if the time resources are within the indicated window, or if the time resources are related in accordance with the indicated relationship. In some examples, the relationship may correspond to a relationship between resources in a same resource set, or an indication of two or more resource sets that are related for SFN communications. The UE may estimate the combined SFN channel based on tracking the first and second reference signals.

A network node may thereby transmit a configuration for reference signal reception in accordance with SFN communications. The configuration may indicate a resource set, a pairing between resources, or some other relationship between resources that are associated with an SFN channel, such as a window. A UE may determine to track reference signals received via the indicated resources jointly in order to perform a channel estimation for the SFN channel based on the reference signals. As such, the configuration may improve communication reliability and coordination between the UE and the one or more TRPs of the network node. By indicating which resources may be paired for SFN communications, the configuration may provide for the UE to refrain from tracking multiple reference signals together, which may reduce UE complexity and processing by the UE. The indicated relationship between resources may, in some examples, improve an SFN channel estimation performed by the UE, which may in turn improve efficiency and communication reliability. Additionally, or alternatively, the network node may refrain from dynamically signaling a reconfiguration for tracking SFN, which may reduce overhead and latency.

Aspects of the disclosure are initially described in the context of wireless communications systems. Additional aspects are described with reference to communication scheme diagrams, resource timelines, and process flows. Aspects of the disclosure are further illustrated by and described with reference to apparatus diagrams, system diagrams, and flowcharts that relate to TRS configuration for SFN communications.

FIG. 1 illustrates an example of a wireless communications system 100 that supports TRS configuration for SFN communications in accordance with one or more aspects of the present disclosure. The wireless communications system 100 may include one or more network nodes 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The network nodes 105 may be dispersed throughout a geographic area to form the wireless communications system 100 and may be devices in different forms or having different capabilities. The network nodes 105 and the UEs 115 may wirelessly communicate via one or more communication links 125. Each network node 105 may provide a coverage area 110 over which the UEs 115 and the network node 105 may establish one or more communication links 125. The coverage area 110 may be an example of a geographic area over which a network node 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network nodes 105 (e.g., a base station, a control node, or some other network node), or network equipment (e.g., core network nodes, relay devices, integrated access and backhaul (IAB) nodes, or other network equipment), as shown in FIG. 1.

The network nodes 105 may communicate with the core network 130, or with one another, or both. For example, the network nodes 105 may interface with the core network 130 through one or more backhaul links 120 (e.g., via an S1, N2, N3, or other interface). The network nodes 105 may communicate with one another over the backhaul links 120 (e.g., via an X2, Xn, or other interface) either directly (e.g., directly between network nodes 105), or indirectly (e.g., via core network 130), or both. In some examples, the backhaul links 120 may be or include one or more wireless links. A UE 115 may communicate with the core network 130 through a communication link 155.

One or more of the network nodes 105 described herein may include or may be referred to by a person having ordinary skill in the art as a base station, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. The network nodes 105 may include or be associated with a set of TRPs 180. The one or more network nodes 105 may include a communications manager 102 configured to transmit signals to a UE 115 and communicate with the UE using one or more TRPs 180 of the set of TRPs 180.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and network nodes 105. In such cases, the disaggregated UE 115 may include the respective physical devices configured to perform various functions and communications, for example to perform one or more of the signaling and TRS configurations for SFN communications described herein.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1. The UEs 115 may each include a communications manager 101, which may receive one or more signals and communicate with one or more TRPs 180 of a set of TRPs 180 associated with a network node 105.

The UEs 115 and the network nodes 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network node 105, or downlink transmissions from a network node 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network nodes 105, the UEs 115, or both) may have hardware configurations that support communications over a particular carrier bandwidth or may be configurable to support communications over one of a set of carrier bandwidths. In some examples, the wireless communications system 100 may include network nodes 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network nodes 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network node 105 may provide communication coverage via one or more cells, for example a macro cell, a small cell, a hot spot, or other types of cells, or any combination thereof. The term "cell" may refer to a logical communication entity used for communication with a network node 105 (e.g., over a carrier) and may be associated with an identifier for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network node 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network node 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network node 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network node 105 may be movable and therefore provide communication coverage for a moving geographic coverage area 110. In some examples, different geographic coverage areas 110 associated with different technologies may overlap, but the different geographic coverage areas 110 may be supported by the same network node 105. In other examples, the overlapping geographic coverage areas 110 associated with different technologies may be supported by different network nodes 105. The wireless communications system 100 may include, for example, a heterogeneous network in which different types of the network nodes 105 provide coverage for various geographic coverage areas 110 using the same or different radio access technologies.

The wireless communications system 100 may support synchronous or asynchronous operation. For synchronous operation, the network nodes 105 may have similar frame timings, and transmissions from different network nodes 105 may be approximately aligned in time. For asynchronous operation, the network nodes 105 may have different frame timings, and transmissions from different network nodes 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network node 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network node 105. Other UEs 115 in such a group may be outside the geographic coverage area 110 of a network node 105 or be otherwise unable to receive transmissions from a network node 105. In some examples, groups of the UEs 115 communicating via D2D communications may utilize a one-to-many (1:M) system in which each UE 115 transmits to every other UE 115 in the group. In some examples, a network node 105 facilitates the scheduling of resources for D2D communications. In other cases, D2D communications are carried out between the UEs 115 without the involvement of a network node 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network nodes 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network node 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs 180. Each access network transmission entity 145 may include one or more antenna panels. In some configurations, various functions of each access network entity 140 or network node 105 may be distributed across various network devices (e.g., radio heads and ANCs) or consolidated into a single network device (e.g., a network node 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network nodes 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network nodes 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network node 105 or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more network node antennas or antenna arrays may be co-located at an antenna assembly, such as an antenna tower. In some examples, antennas or antenna arrays associated with a network node 105 may be located in diverse geographic locations. A network node 105 may have an antenna array with a number of rows and columns of antenna ports that the network node 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network nodes 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beam forming operations. For example, a network node 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times in different directions. For example, the network node 105 may transmit a signal according to different beamforming weight sets associated with different directions of transmission. Transmissions in different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by a network node 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network node 105 in different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or radio frequency beamforming to generate a combined beam for transmission (e.g., from a network node 105 to a UE 115). The UE 115 may report feedback that indicates precoding weights for one or more beam directions, and the feedback may correspond to a configured number of beams across a system bandwidth or one or more sub-bands. The network node 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network node 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network node 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network node 105 or a core network 130 supporting radio bearers for user plane data. At the physical layer, transport channels may be mapped to physical channels.

Techniques described herein, in addition to or as an alternative to be carried out between UEs 115 and network nodes 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network nodes 105 may include CUs 160, DUs 165, and RUs 170 and may be referred to as donor network nodes 105 or IAB donors. One or more DUs 165 (e.g., and/or RUs 170) associated with a donor network node 105 may be partially controlled by CUs 160 associated with the donor network node 105. The one or more donor network nodes 105 (e.g., IAB donors) may be in communication with one or more additional network nodes 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to perform one or more of the signaling and TRS configurations for SFN communications described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network nodes 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to perform one or more of the signaling and TRS configurations for SFN communications described herein.

The UEs 115 and the network nodes 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may perform a channel estimation for an SFN channel associated with at least two TRPs 180 based on an SFN configuration for the UE 115. The UE 115 may, in some examples, transmit a UE capability message to indicate support for an SFN configuration. That is, the UE 115 may indicate a capability to receive signals from two or more TRPs 180 in a single time resource. A network entity, such as a network node 105, a TRP 180 of a network node 105, or some other entity, may transmit a control message to the UE 115 to indicate resources for reference signal reception from at least two TRPs 180 of the network in accordance with the SFN configuration. The control message may indicate a resource set for simultaneous reference signal reception from a first TRP 180 and a second TRP 180 in accordance with the UE capability message. Additionally, or alternatively, the control message may indicate two or more time resources associated with reference signals transmitted by the first TRP 180 and the second TRP 180 in accordance with the SFN configuration. The UE 115 may receive a first reference signal from the first TRP 180 and a second reference signal from the second TRP 180 in accordance with the resource configuration. The UE 115 may perform a channel estimation for an SFN channel associated with the first TRP 180 and the second TRP 180 based on the first reference signal and the second reference signal in accordance with the SFN configuration. The UE may communicate with at least one of the first TRP 180 or the second TRP 180 in accordance with the channel estimation. The UE 115 may thereby perform a channel estimation for an SFN channel based on a configuration of one or more resources associated with the SFN configuration.

Figure 2:
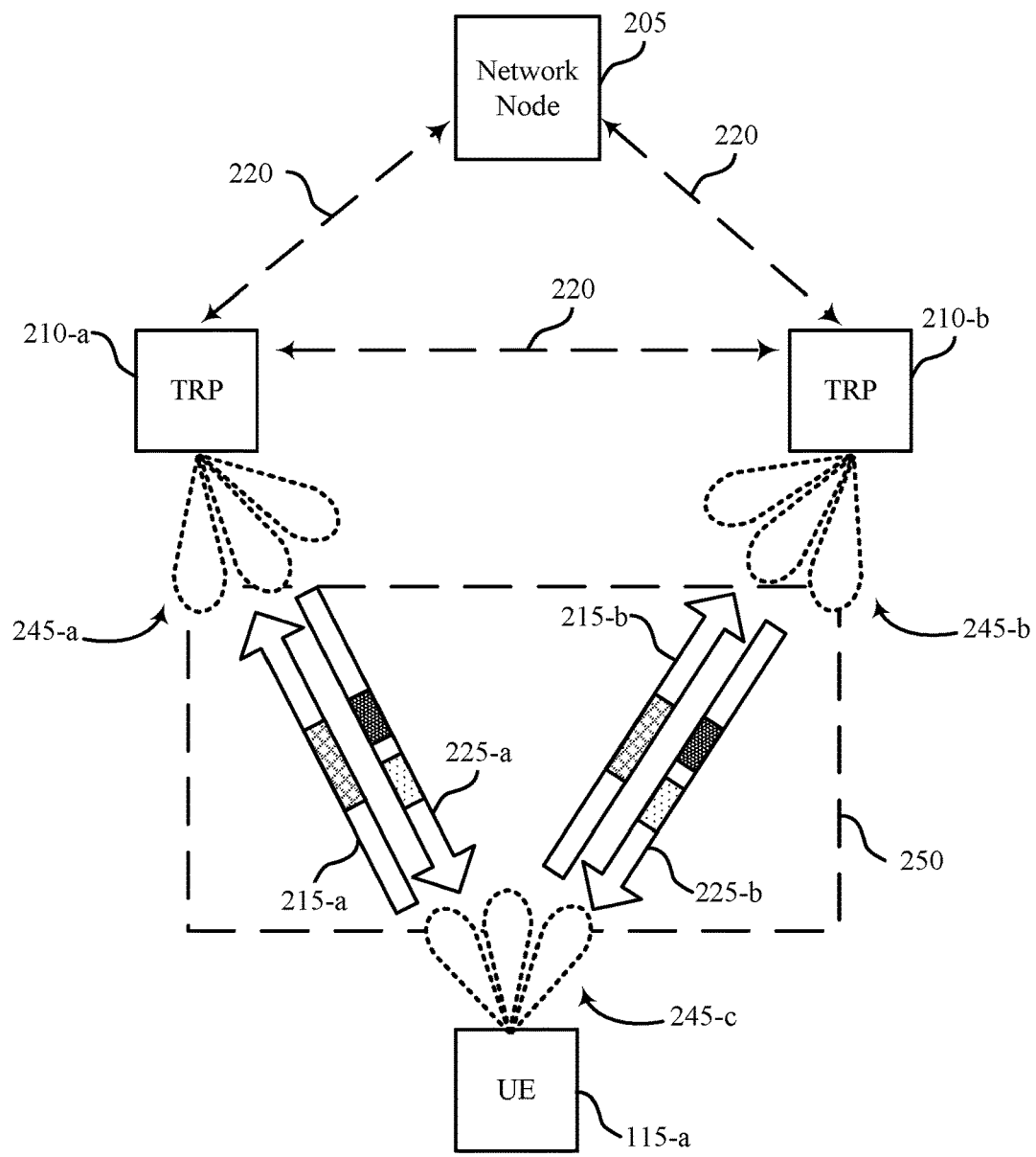
FIG. 2 illustrates an example of a wireless communications system that supports TRS configuration for SFN communications in accordance with one or more aspects of the present disclosure.

FIG. 2 illustrates an example of a wireless communications system 200 that supports TRS configuration for SFN communications in accordance with one or more aspects of the present disclosure. In some examples, the wireless communications system 200 may implement or be implemented by aspects of the wireless communications system 100. For example, the wireless communications system 200 may include a UE 115-a, which may represent an example of a UE 115 as described with reference to FIG. 1. The UE 115-a may be in wireless communications with a network node 205, which may represent an example of a network node 105 or some other network entity as described with reference to FIG. 1. The network node 205 may transmit or relay data or control signaling to the UE 115-a via one or more other access network transmission entities, which may be referred to as radio heads or TRPs 210.

The TRPs 210-a and 210-b may be included in or associated with the network node 205. The network node 205 and the TRPs 210 may communicate with each other via one or more backhaul links 220, which may be examples of a backhaul link 120 as described with reference to FIG. 1. The UE 115-a may communicate with the TRPs 210 via uplink communication links 215 and downlink communication links 225. For example, the TRP 210-a and the TRP 210-b may transmit, to the UE 115-a, reference signals 230, a control message 235, or both, via the downlink communication links 225-a and 225-b, respectively. The UE 115-a may transmit one or more uplink signals and/or a UE capability message 240 to the TRP 210-a, the TRP 210-b, or both, via the uplink communication links 215-a and 215-b, respectively. In some examples, the control message 235 may include a resource configuration for SFN communications by the UE 115-a.

The UE 115-a and each of the TRPs 210-a and 210-b may communicate using a set of beams 245. For example, the UE 115-a may communicate using one or more beams of the set of beams 245-c. The UE 115-a may switch between beams based on communications from the TRP 210-a, the TRP 210-b, or both. The TRP 210-a may communicate using one or more beams of the set of beams 245-a and the TRP 210-b may communicate using one or more beams of the set of beams 245-b. Each TRP 210 may switch between beams based on communications from the UE 115-a.

The TRPs 210 may communicate with the UE 115-a using an SDM scheme, an FDM scheme, a TDM scheme, or a combination thereof. The TRPs 210 may coordinate a transmission of a downlink channel (e.g., a physical downlink shared channel (PDSCH), a physical downlink control channel (PDCCH), or both), an uplink channel (e.g., a physical uplink shared channel (PUSCH), a physical uplink control channel (PUCCH), or both). For example, an SDM scheme may involve the TRP 210-a and the TRP 210-b performing a joint transmission over a same resource (e.g., over a same set of resource elements and OFDM symbols) based on transmitting different layers, such as spatial layers, with different transmission configuration indication (TCI) states. Additionally, or alternatively, an FDM scheme may involve the TRP 210-a and the TRP 210-b performing the joint transmissions over different frequency resources and overlapping time resources, such as over different sets of resource elements but over a same set of OFDM symbols, based on transmitting different sets of frequency-domain resources (e.g., resource elements) with different TCI states. In some examples of a TDM scheme, the TRP 210-a and the TRP 210-b may perform the joint transmissions over different time resources and overlapping frequency resources, such as over different sets of OFDM symbols and overlapping set of resource elements, based on transmitting different sets of time-domain resources (e.g., OFDM symbols, slots, or mini-slots) with different TCI states.

In some examples, the TRP 210-a and the TRP 210-b may perform joint transmissions to the UE 115-a using an SFN communication configuration, which may also be referred to as a single frequency communication scheme. The SFN communication configuration may be a type of multi-TRP communication scheme in which multiple TRPs 210 may transmit a same data sequence on overlapping time and/or frequency resources. The SFN communications may be transmitted according to one or more types of communications schemes. For example, the TRP 210-a and the TRP 210-b may transmit a same transmission to the UE 115-a according to a multi-TRP communications configuration, such as an SDM scheme, an FDM scheme, a TDM scheme, or the like, where the downlink transmission is associated with two or more TCI states corresponding to the two or more TRPs 210. In other words, the downlink communication links 225-a and 225-b may be or may be part of an "SFNed" downlink communication link, which may be referred to as a combined SFN channel 250. A non-SFN communications configuration may correspond to communications in which two or more TPRs 210 refrain from utilizing combined SFN channel 250, and instead transmit the same or different data or control information to a UE 115 on non-overlapping time and/or frequency resources (e.g., in an asynchronous manner).

The TRP 210-a and the TRP 210-b may perform joint transmissions to the UE 115-a according to various types of SFN communication schemes, such as an SFN communication scheme 1 or an SFN communication scheme 2, which are described in further detail with respect to FIG. 3. The UE 115-a may use macro diversity or frequency diversity gain to assist in receiving signals from the multiple spatially dispersed TRPs 210. In some cases, one or more TRPs 210 configured to use SFN may use beamforming over a set of beams 245 to transmit a signal over the one or more beams and may alternatively or additionally transmit a signal in an area, direction, or both (e.g., using a single beam). In some examples, the UE 115-a may use an SFN scheme if the UE 115-a has relatively high mobility, such as in a high speed train (HST) scenario. Further, SFN communications may be useful for some service types, such as broadcast or multicast services.

In some examples, the network node 205 may not indicate, to the UE 115-a, that the data is coming from different TRPs 210, which may be referred to as a transparent SFN communication configuration. That is, the UE 115-a may assume there is a single channel to receive and demodulate, and the UE 115-a may select an effective beam from the set of beams 245-c for receiving the transmissions via the channel. In some examples, the channels used by the different TRPs 210 may be relatively different, and it may be beneficial to indicate that the transmission is coming from separate TRPs 210 and corresponding beams. As such, during some SFN communications configurations, the network node 205 may indicate that the transmission is coming from separate TRPs 210 and corresponding beams (e.g., a received beam is a combination of a first beam from the TRP 210-a and a second beam from the TRP 210-b), which may be referred to as a non-transparent SFN communication configuration. Different schemes for SFN communication configurations are described in further detail with reference to FIGS. 3A and 3B.

The wireless communications system 200 may support one or more multi-TRP communication configurations, single-TRP communication configurations, or both. The multi-TRP communication configurations may be or may support SFN or non-SFN schemes. For example, as illustrated in the wireless communications system 200, the TRP 210-a, the TRP 210-b, or both may perform a joint transmission (e.g., a multi-TRP transmission) and signaling to the UE 115-a, may independently communicate with the UE 115-a (e.g., may perform a non-joint transmission or a single TRP based transmission), or both. In some examples of multi-TRP communications, the TRPs 210-a and 210-b may communicate with the UE 115-a and one or more other UEs 115 using different communication schemes to increase spectral efficiency. The communication schemes may include SDM, FDM, TDM, or a multi-TRP scheme. The communication schemes may include one or more of the non-SFN or SFN schemes with or without Doppler shift pre-compensation. In some examples, the communications schemes may include a single TRP/TCI based transmission with dynamic transmission point switching. In some cases, two or more transmission configuration options or the corresponding transmission modes may be switched dynamically by the network depending on network loading, UE location, channel conditions, UE speed, UE type and other factors.

For some SFN communications (e.g., SFN communication scheme 1, as described with reference to FIG. 3A), the network node 205 may configure one or more resource sets for transmission of the reference signals 230 to the UE 115-a (e.g., UE-specific non-zero power (NZP) resource sets, such as NZP-CSI-RS-ResourceSets with higher layer parameter trs-Info). The network node 205 may configure the resource sets in a distributed manner, such that each TRP 210 may transmit the reference signals 230 (e.g., channel state information (CSI) reference signals) via one or more resource sets. Additionally, or alternatively, the network node 205 may configure a limit on the number of resource sets in the wireless communications system 200, such that the number of resource sets is the same as a number of TRPs 210 that are deployed in an SFN area.

Each TRP 210 may transmit the reference signals 230 via the resource sets. The reference signals 230 may include synchronization signal blocks (SSBs), TRSs, demodulation reference signals (DMRSs), or any combination thereof. For example, the TRP 210-a may transmit one or more SSBs to the UE 115-a for synchronization. The TRP 210-a may transmit one or more TRSs (e.g., per-TRP TRSs) that may indicate TCI state information (e.g., quasi-colocation (QCL) information) associated with the TRP 210-a based on the SSBs. The TRP 210-a may additionally, or alternatively, transmit one or more DMRSs that may derive TCI state information from the TRS transmitted by the TRP 210-a and a TRS transmitted by the TRP 210-b (e.g., corresponding to an SFN channel).

The UE 115-a may thereby receive a first TRS from the TRP 210-a and a second TRS from the TRP 210-b. The UE 115-a may track a first channel (e.g., $H_1$) between the UE 115-a and the TRP 210-a based on the first TRS. The UE 115-a may track a second channel (e.g., $H_2$) between the UE 115-a and the TRP 210-b based on the second TRS. If the TRP 210-a and the TRP 210-b perform a joint transmission to the UE 115-a using an SFN communications configuration, the UE 115-a may utilize the first TRS and the second TRS for demodulating the combined SFN channel 250 (e.g., an effective channel, $H_e$, where $H_e \approx H_1 + H_2$) associated with both TRPs 210 (e.g., the UE 115-a may utilize the first and second TRSs as a source reference signal for QCL). In some examples, tracking and demodulating a respective channel may be referred to as performing a channel estimation procedure for the channel.

The network node 205 may, in some cases, configure one or more resource sets (e.g., n resource sets associated with each TCI state) per TRP 210, and the UE 115-a may track each reference signal 230 configured by the network. That is, the UE 115-a may track up to n TRSs received from the TRP 210-a and n TRSs received from the TRP 210-b. The UE 115-a may additionally, or alternatively, track a combination of TRSs received from both the TRP 210-a and the TRP 210-b to use for estimating and demodulating the combined SFN channel 250 (e.g., based on a linear combination of QCL information from the TRPs 210). In some cases, whether or not to track the combined SFN channel 250 may be configured at the UE 115-a (e.g., pre-configured according to a rule) to reduce processing. However, if n resource sets are configured for each TRP 210, there may be up to $n^2$ combinations of TRSs and corresponding beams for the UE 115-a to track to estimate an combined SFN channel 250. Additionally, or alternatively, the effective SFN beam used to communicate with the UE 115-a may be based on a location of the UE 115-a within an SFN region (e.g., relative to the TRPs 210). As such, there may be relatively high overhead and processing by the UE 115-a to perform an SFN channel estimation.

In some cases, one or more combinations of reference signals 230 from two or more TRPs 210 may not provide an accurate representation or estimation of the effective combined SFN channel 250. For example, if the reference signals 230 are transmitted via resources that are spaced relatively far apart in a time domain (e.g., TDMed TRSs), a tracking loop used by the UE 115-a to track a first reference signal 230 may not be combined with a tracking loop used by the UE 115-a to track a second reference signal 230, and the UE 115-a may not estimate the effective combined SFN channel 250 accurately. In some cases, the network node 205 may indicate a pairing between two or more reference signal resources that can be combined and utilized as a source signal for an SFN transmission. The UE 115-a may track reference signals 230 received via the indicated two or more resources jointly based on the indication. The network node 205 may indicate the pairing via RRC signaling. For example, the TRP 210-a, the TRP 210-b, or both may relay the RRC signaling or other control signaling from the network node 205 to the UE 115-a. Such signaling to indicate dynamic pairing of reference signal resources may result in relatively high overhead and latency.

To improve channel estimation and reference signal transmission for SFN communications while reducing overhead, the network node 205 described herein may transmit a control message 235 to the UE 115-a to indicate a resource configuration for the UE 115-a to use for tracking a combined SFN channel 250. The resource configuration may indicate dynamic pairings of TRP-specific reference signals 230 for SFN communications. For example, the resource configuration may indicate a pairing between two or more resource sets that are overlapping in a time domain, a paring between two or more resources that are non-overlapping in the time domain based on a relationship between the two or more resources, or both. In some examples, a control channel (e.g., a scheduling downlink control information (DCI) or PDCCH) that schedules the reference signals 230, a reference signal configuration message (e.g., a TRS configuration message), or a MAC-CE that activates the resource configuration may include one or more fields configured to indicate an SFN operation is to be performed by the UE 115-a based on the reference signal resources.

In some examples, the UE 115-a may be configured to identify an association between TRS resources for SFN channel estimation based on the resource configuration and a joint trigger of two or more overlapping resource sets. For example, the TRPs 210-a and 210-b may transmit first and second TRSs, respectively, to the UE 115-a in overlapping time resources (e.g., a same symbol). The TRP 210-a and the TRP 210-b may scramble the TRSs according to different scrambling sequences that are associated with an ID of the respective TRP 210, or the TRPs 210 may transmit the TRSs in an FDM or SDM manner. Each resource set may be configured per-TRP 210. In some examples, two or more resource sets may be configured with a same periodicity (e.g., semi-persistent, periodic or aperiodic), same offset parameters, or both that may be jointly triggered (e.g., via a same PDCCH or DCI message). Additionally, or alternatively, two or more resource sets may be scheduled by separate triggering DCI (e.g., carried by separate PDCCH), but a scheduling offset for the two or more resource sets may be configured such that the resource sets are overlapping in the time domain (e.g., the TRSs are received simultaneously, or at least partially overlapping in time). The UE 115-a may be configured to track the TRSs received from the TRP 210-a and the TRP 210-b as potential candidates for an SFN operation based on the TRSs being received in overlapping time resources. The resource configuration for tracking overlapping resource sets for SFN communications is described in further detail elsewhere herein, including with reference to FIG. 4.

The network node 205 may transmit the control message 235 to the UE 115-a based on a capability of the UE 115-a. For example, the UE 115-a may transmit the UE capability message 240 to the TRP 210-a, the TRP 210-b, or both, via the respective uplink communication links 215-a and/or 215-b. The TRPs 210 may forward the UE capability message 240 to the network node 205. The UE capability message 240 may indicate a capability to support one or more multi-TRP communication configurations (e.g., SFN, SDM, FDM, or any combination thereof). That is, the UE capability message 240 may indicate support for an SFN configuration in which two or more reference signals 230 are received by the UE 115-a in a same time resource (e.g., a same symbol).

The UE capability message 240 may include one or more fields configured to indicate a capability of the UE 115-a to receive the reference signals 230 from at least the TRP 210-a and the TRP 210-b in a same time resource in accordance with an SFN communications configuration. In some examples, the UE capability message 240 may be configured to indicate support for a multi-TRP communications configuration via a PDCCH or a PDSCH, and a field may be added or re-configured within the UE capability message 240 to indicate support for receiving the reference signals 230 in overlapping time resources. Additionally, or alternatively, the UE capability message 240 may indicate support for SFN communications by the UE 115-a, and the network node 205 may identify, based on the support for the SFN communications, that the UE 115-a is capable of receiving two or more reference signals 230 in a same time resource (e.g., using SFN, SDM, FDM, or other communication configuration types). If the UE 115-a indicates support for SDM or FDM communications via overlapping time resources, the UE capability may be a function of a frequency offset between frequency resources (e.g., resource elements) used for TRS transmission. For example, the TRP 210-a may transmit a first reference signal 230 to the UE 115-a via a first time resource and a first frequency resource, and the TRP 210-b may transmit a second reference signal 230 to the UE 115-a via the first time resource and a second frequency resource that is offset from the first frequency resource by an offset that is the same as or less than the offset indicated via the UE capability message 240.

In some examples, the control message 235 or a second control message may indicate a resource configuration for two or more time resources for SFN channel estimation. That is, the UE 115-a may be configured with an association between the two or more time resources for SFN channel estimation. The resource configuration may indicate a window configured for the UE 115-a, a relationship between per-TRP resource sets, or both. The UE 115-a may determine to track a first reference signal 230 from the TRP 210-a and a second reference signal 230 from the TRP 210-b jointly for an SFN channel estimation based on the reference signals 230 being received via resources that are within the window or resources that are within related resource sets based on the resource configuration. The resource configuration and joint tracking between two or more time resources is described in further detail elsewhere herein, including with reference to FIG. 5.

Figure 3A:
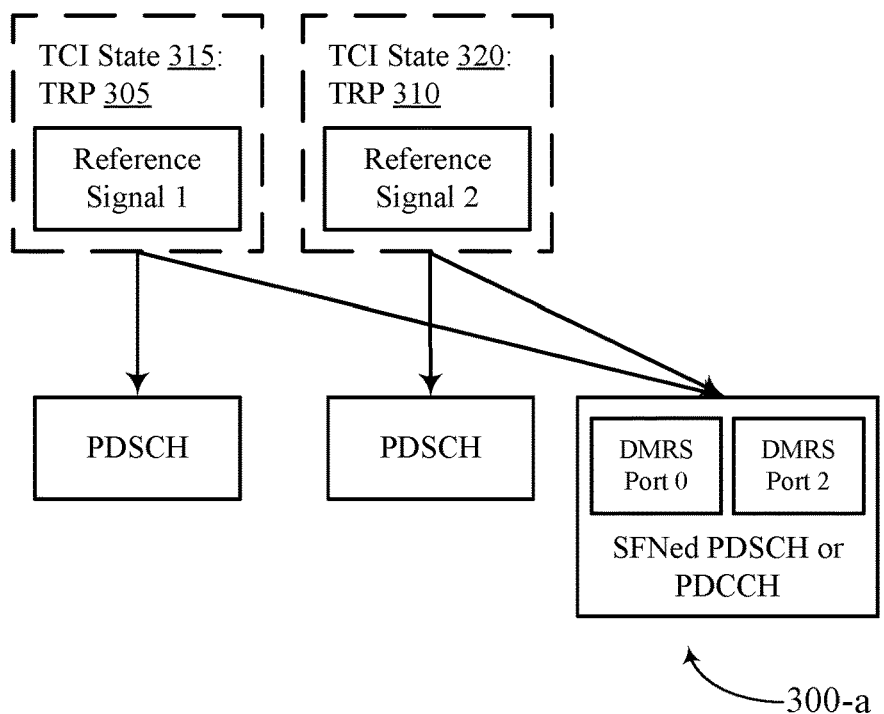
FIGS. 3A and 3B illustrate examples of communication scheme diagrams that support TRS configuration for SFN communications in accordance with one or more aspects of the present disclosure.
Figure 3B:
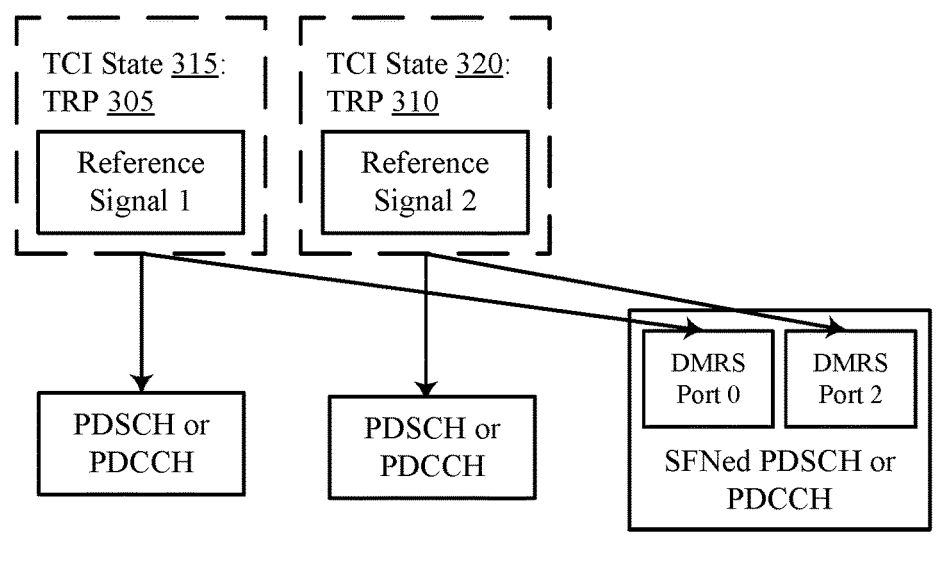

FIGS. 3A and 3B illustrate examples of communication scheme diagrams 300 that support TRS configuration for SFN communications in accordance with one or more aspects of the present disclosure. In some examples, the communication scheme diagrams 300-a and 300-b may be implemented to realize aspects of the wireless communications system 100 or the wireless communications system 200. For example, a TRP 305, a TRP 310, or both, which may be examples of TRPs 210 as described with reference to FIG. 2 (e.g., multi-TRPs), and one or more UEs 115 may employ one or more SFN schemes illustrated by the communication scheme diagrams 300-a and 300-b, as described with reference to FIGS. 1 and 2. A network node 105 or 205 may dynamically transmit a joint DMRS configuration and transmission mode configuration. The transmission mode configuration may relate to a transmission mode for communicating with one or more TRPs. In some cases, the TRP 305, the TRP 310, or both may transmit one or more data messages to a UE 115 using an SFN scheme of the SFN schemes based on the joint DMRS configuration and transmission mode indication. In some cases, the communication scheme diagrams 300-a and 300-b may illustrate joint downlink transmissions to the UE 115 from a TRP 305 applying a TCI state 315 and from a TRP 310 applying a TCI state 320.

The communication scheme diagram 300-a illustrates an SFN scheme 1. In such an SFN scheme 1, the TRP 305 and the TRP 310 may transmit two separate reference signals (e.g., a reference signal 1 and a reference signal 2, respectively). Each reference signal may correspond to a single-TRP PDSCH transmission and a corresponding TCI state of the TRP. The reference signals may also be associated with a joint "SFNed" PDSCH or, in some examples PDCCH. That is, each of the reference signal 1 and the reference signal 2 may serve as a source reference signal for demodulating a PDCCH or a PDSCH that is transmitted in an SFN manner. Each DMRS port (e.g., DMRS port 0 and DMRS port 2) or data layer of the "SFNed" PDSCH may be associated with both the TCI state 315 and the TCI state 320. In other words, the TRP 305 and the TRP 310 may transmit reference signals (such as TRSs) in a TRP-specific or non-SFN manner while the associated DMRS (e.g., for demodulating the channel) and PDSCH or PDCCH from the TRPs are transmitted in an SFN manner.

The communication scheme diagram 300-b illustrates an SFN scheme 2. In such an SFN scheme 2, the TRP 305 and the TRP 310 may transmit two separate reference signals (e.g., a reference signal 1 and a reference signal 2, respectively). Each reference signal may correspond to a single-TRP PDSCH transmission. The reference signals may also be associated with a joint PDSCH or PDCCH transmission in which each data layer of the joint PDSCH or PDCCH is associated with both of the TCI state 315 and the TCI state 320 while each DMRS port of the joint PDSCH or PDCCH is associated with either the TCI state 315 or the TCI state 320 (e.g., not both). For example, a DMRS port 0 of the joint PDSCH may be associated with the TCI state 315 (and not with the TCI state 320) and a DMRS port 2 of the joint PDSCH may be associated with the TCI state 320 (and not with the TCI state 315). In some examples, the DMRS port 0 may be QCLed with the TCI state 315 and the DMRS port 2 may be QCLed with the TCI state 320. The data layers of the joint PDSCH may be associated with both the TCI state 315 and the TCI state 320 through the DMRS ports. In other words, the TRP 305 and the TRP 310 may transmit reference signals (such as TRSs) and DMRSs in a TRP-specific or non-SFN manner while the associated with PDSCH (e.g., data layers) from the TRPs is transmitted in an SFN manner.

The UE 115 may perform a joint channel estimation for an SFN channel (the SFNed PDSCH or PDCCH) while operating according to the SFN communication scheme 1 or 2. The UE 115 may track reference signals (e.g., TRSs) from each of the TRP 305 and the TRP 310 separately to estimate a channel between the UE 115 and the respective TRP. The UE 115 may additionally, or alternatively, track the reference signals from each of the TRP 305 and the TRP 310 jointly to estimate an SFN channel associated with the TRP 305 and the TRP 310. In some cases, the TRP 305 and the TRP 310 may each be configured with one or more resource sets, and the UE 115 may monitor any combination of TRSs transmitted via the resource sets to estimate an SFN channel.

To reduce overhead and UE complexity, the UE 115 may be configured with a resource configuration for estimating an SFN channel. The resource configuration may indicate a dynamic pairing or grouping between resource sets that may be used for estimating a joint SFN channel. For example, the resource configuration may indicate that the UE 115 should jointly track resources received via resource sets that are overlapping in a time domain. Additionally, or alternatively, the resource configuration may indicate a relationship between two or more resource sets or a window associated with two or more time resources, and the UE 115 may be configured to track resources in the indicated resource sets or within the window jointly for an SFN channel estimation. The resource configurations and methods for tracking pairs of TRSs for SFN operations are described in further detail elsewhere herein, including with reference to FIGS. 4 and 5.

Figure 4:
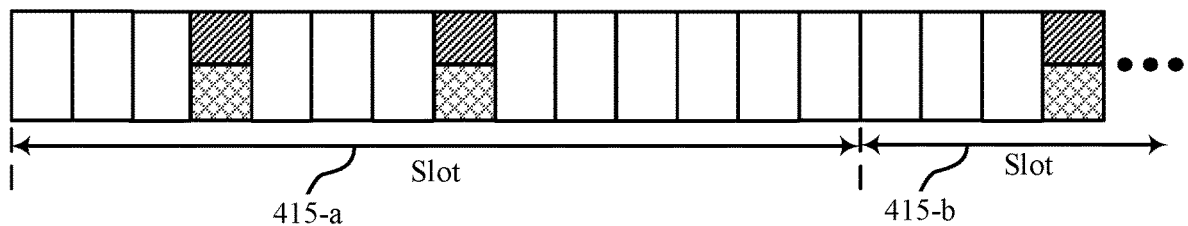
FIG. 4 illustrates an example of a resource diagram that supports TRS configuration for SFN communications in accordance with one or more aspects of the present disclosure.
Figure 4:
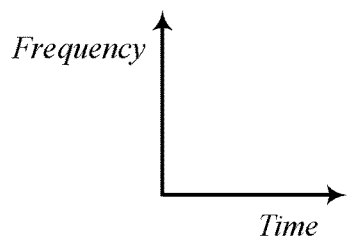

FIG. 4 illustrates an example of a reference signal resource timeline 400 that supports TRS configuration for SFN communications in accordance with one or more aspects of the present disclosure. The reference signal resource timeline 400 may illustrate a configuration of resources within one or more slots 415-a and 415-b that are allocated for SFN communications between a UE 115, a first TRP 410-a, and a second TRP 410-b, which may be examples of a UE and TRPs as described with reference to FIGS. 1 through 3. In some examples, the UE 115 may be configured to identify an association between resources for SFN communications based on the resources being overlapping in a time domain.

In the example of FIG. 4, a resource set 405-a may be configured (e.g., pre-configured) for a first TRP 410-a and a resource set 405-b may be configured for a second TRP 410-b (e.g., TRP-specific resource sets 405). The resource sets 405 may include one or more time and frequency resources allocated for reference signal transmission by the respective TRP 410. The resource sets 405-a and 405-b may include resources that may be overlapping in time (e.g., in a same symbol). The TRP 410-a may transmit a first reference signal via the resource set 405-a and the TRP 410-b may transmit a second reference signal via the resource set 405-b. In some examples, the TRPs 410 may operate according to a single-TRP communications configuration (e.g., a non-SFN scheme), in which the TRPs 410 may transmit the reference signals to the UE 115 separately. Additionally, or alternatively, the TRPs 410 may communicate with the UE 115 according to an SFN communications configuration, as described with reference to FIGS. 2 and 3. The TRPs 410 may communicate with the UE 115 according to an SFN communication scheme 1 or 2, or some other SFN communications scheme, as described with reference to FIGS. 3A and 3B.

If one or more resources for reference signal transmission by two TRPs 410 overlap in time (e.g., simultaneous reference signal transmissions), the TRP 410-a and the TRP 410-b may transmit a first reference signal and a second reference signal, respectively, via the resources using different scrambling sequences, in an SDM manner, or in an FDM manner. For example, the TRP 410-a may transmit a first reference signal to the UE 115 via a first time and frequency resource of the first resource set 405-a, and the first reference signal may be scrambled according to a first scrambling sequence. The TRP 410-b may transmit a second reference signal to the UE 115 via a second time and frequency resource of the second resource set 405-b that is overlapping with the first time and frequency resource (e.g., via a same symbol and resource element). The second reference signal may be scrambled according to a second scrambling sequence. The first and second scrambling sequences may be functions of first and second IDs of the TRPs 410-a and 405-b, respectively.

Additionally, or alternatively, the TRP 410-a may transmit the first reference signal via a first time resource in the first resource set 405-a and the TRP 410-b may transmit the second reference signal via a second time resource in the second resource set 405-b that is overlapping with the first time resource (e.g., via a same symbol) in an SDM manner. That is, the reference signals may be SDMed and may correspond to different code division multiplexing (CDM) groups. In another example, the reference signals may be transmitted in an FDM manner, such that the reference signals may be transmitted in a same time resource and different frequency resources.

The UE 115 may be configured to identify an association between the resource set 405-a and the resource set 405-b dynamically based on a joint trigger of the two resource sets 405. For example, a control signal that triggers the reference signal transmissions, such as DCI, may configure the resource set 405-a and the resource set 405-b with a same periodicity (e.g., aperiodic, semi-persistent, or periodic reference signal transmissions), same offset parameters, or both. The UE 115 may be configured (e.g., pre-configured according to one or more rules) to identify the joint trigger for the resource sets 405-a and 405-b and track the resources in both of the resource sets 405-a and 405-b jointly as potential candidates for an SFN operation. That is, the UE 115 may monitor the first reference signal and the second reference signal together as potential source signals for estimating an SFN channel associated with the TRP 410-a and the TRP 410-b.

Additionally, or alternatively, a first PDCCH may carry first DCI that schedules (e.g., triggers) the first reference signal transmission via the resource set 405-a and a second PDCCH may carry second DCI that schedules the second reference signal transmission via the resource set 405-*b*. In such cases, the first and second DCI may configure a scheduling offset such that the first reference signal and the second reference signal are received in resources that overlap in the time domain (e.g., the first and second reference signals are received simultaneously, or at least partially overlapping in time). The UE 115 may identify that the first resource set 405-*a* and the second resource set 405-*b* include overlapping time resources, and the UE 115 may be configured to track resources in both the resource set 405-*a* and the resource set 405-*b* jointly as potential candidates for an SFN operation based on the overlap between the resource sets 405.

The network may schedule the overlapping resources for SFN transmissions based on a UE capability message that indicates a capability of the UE 115 to support an SFN configuration, as described with reference to FIG. 2. The UE 115 may thereby perform joint TRS tracking and SFN channel estimation based on two or more TRSs received from two or more TRPs 410 on a same symbol or other time resource.

Figure 5:
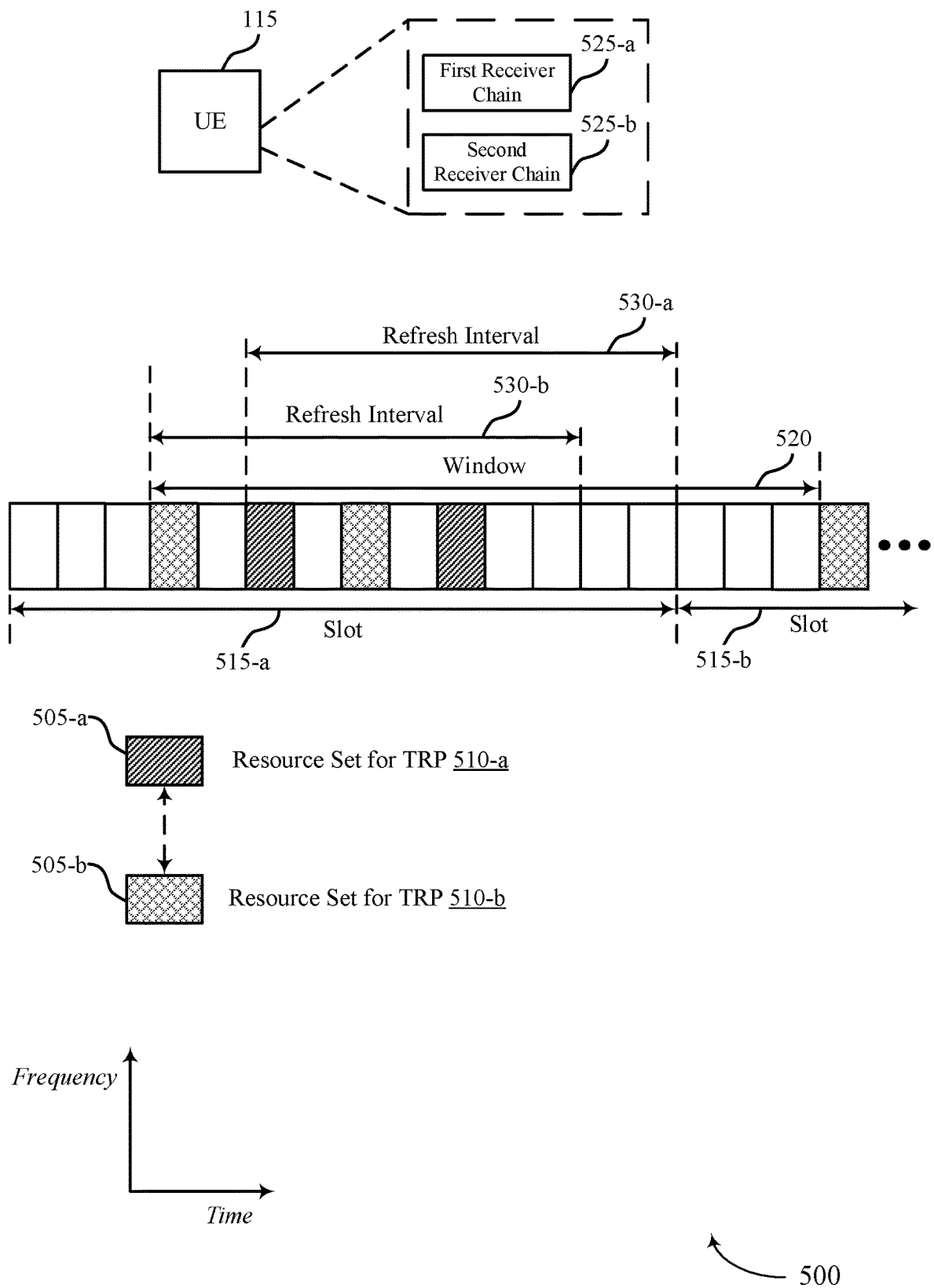
FIG. 5 illustrates an example of a resource diagram that supports TRS configuration for SFN communications in accordance with one or more aspects of the present disclosure.

FIG. 5 illustrates an example of a reference signal resource timeline 500 that supports TRS configuration for SFN communications in accordance with one or more aspects of the present disclosure. The reference signal resource timeline 500 may illustrate a configuration of resources within one or more slots 515-*a* and 515-*b* that are allocated for SFN communications between a UE 115, a first TRP 510-*a*, and a second TRP 510-*b*, which may be examples of a UE and TRPs as described with reference to FIGS. 1 through 4. In some examples, the UE 115 may be configured to identify an association between resources for SFN communications based on a window 520 configured for the UE 115, an indicated relationship or association between the resource sets 505, or both. In some examples, the window 520 may be configured in accordance with a window configuration, which may indicate a number of slots or symbols, or absolute time, for the window 520. The number of slots or symbols may be based on a numerology associated with the window 520, a frame numerology for a frame associated with the window 520, or some combination. The numerology or frame numerology may indicate a subcarrier spacing, a symbol duration, a cyclic prefix (e.g., normal or extended), etc.

In the example of FIG. 5, a resource set 505-*a* may be configured (e.g., pre-configured) for a first TRP 510-*a* and a resource set 505-*b* may be configured for a second TRP 510-*b* (e.g., TRP-specific resource sets 505). The resource sets 505 may include one or more time and frequency resources allocated for reference signal transmission by the respective TRP 510. The resource sets 505-*a* and 505-*b* may include separate time resources that are non-overlapping in time. The TRP 510-*a* may transmit a first reference signal via the resource set 505-*a* and the TRP 510-*b* may transmit a second reference signal via the resource set 505-*b*. In some examples, the TRPs 510 may operate according to a single-TRP communications configuration (e.g., a non-SFN scheme), in which the TRPs 510 may transmit the reference signals to the UE 115 separately. Additionally, or alternatively, the TRPs 510 may communicate with the UE 115 according to an SFN communications configuration, as described with reference to FIGS. 2 and 3. The TRPs 510 may communicate with the UE 115 according to an SFN communication scheme 1 or 2, or some other SFN communications scheme, as described with reference to FIGS. 3A and 3B.

In the example of FIG. 5, the UE 115 may be configured to dynamically identify an association between two or more different time resources in the resource sets 505-*a* and 505-*b* based on a resource configuration for the two or more time resources. The UE 115 may receive an indication of the resource configuration via a control message, as described with reference to FIG. 2. The resource configuration may indicate a window 520 associated with the two or more time resources, an association between two or more different resource sets 505, or both. The UE 115 may determine to track the indicated two or more resources jointly for SFN channel estimation based on the resource configuration.

In some examples, the resource configuration may indicate that the UE 115 is to identify reference signals for joint SFN tracking based on the window 520. The UE 115 may be configured with the window 520, or the UE 115 may receive RRC signaling, or some other control signaling, that indicates the window 520. Reference signal resources within the window 520 may be paired for joint reference signal tracking. The reference signal resources within the window 520 may be from a same resource set 505 (e.g., an NZP CSI-RS set), from different resource sets 505, or both. That is, the window 520 may span one or more resource sets 505. In some examples, the UE 115 may receive control signaling indicating a configuration of the resource sets 505-*a* and 505-*b* within the window 520. Additionally, or alternatively, the UE 115 may determine that the resource sets 505-*a* and 505-*b* are within the window 520 based on a periodicity of resources within the resource sets 505, an offset associated with the resource sets 505, a UE capability, or any combination thereof.

In the example of FIG. 5, resources from the resource set 505-*a* and the resource set 505-*b* may be within the window 520. If the UE 115 is configured (e.g., pre-configured) with the window 520 or receives control signaling indicating the window 520, the UE 115 may monitor and track reference signals received via the resource sets 505-*a* and 505-*b* within the window 520 jointly as potential candidates for an SFN operation. The UE 115 may receive a first reference signal from the TRP 510-*a* via the resource set 505-*a* in the slot 515-*a*. The UE 115 may receive a second reference signal from the TRP 510-*b* via the resource set 505-*b* in the slot 515-*a*. The reference signals may be received in separate time resources that may be located within the window 520. The UE 115 may perform a channel estimation for an SFN channel associated with the TRP 510-*a* and the TRP 510-*b* based on the time resources being within the window 520. The resources of the resource set 505-*b* that are located within the slot 515-*b* in FIG. 5 may be outside of the window 520. As such, the UE 115 may not monitor the resources of the resource set 505-*b* in the slot 515-*b* as potential candidates for an SFN operation with the resources within the window 520.

A starting boundary of the window 520 may be indicated via the configuration for the window 520. The starting boundary may be defined relative to a time domain location of the reference signal resources (e.g., a moving window 520). For example, a starting boundary of the window 520 may be based on a symbol or other TTI in which a TRS is received by the UE 115 via the resource sets 505-*a* or 505-*b*. Additionally, or alternatively, the starting boundary of the window 520 may be defined relative to a control channel that triggers reference signal transmissions via the reference signal resources (e.g., a fixed window 520). For example, a network node may transmit DCI or some other control message via a PDCCH to the UE 115 to schedule one or more reference signals to be transmitted via the resource sets

505. The starting boundary of the window may be defined relative to a last symbol of the PDCCH (e.g., Xms or X symbols after a last symbol of the PDCCH).

The UE 115 may maintain a first receiver chain 525-*a* associated with the TRP 510-*a* and a second receiver chain 525-*b* associated with the TRP 510-*b*, as illustrated in FIG. 5. For example, the UE 115 may operate in a discontinuous reception (DRX) mode with TRP 510-*a* or TRP 510-*b*. In a case where the UE 115 operates in the DRX mode with TRP 510-*a*, the UE 115 may power on the first receiver chain 525-*a* associated with the TRP 510-*a* and monitor resource set 505-*a*, and the time during which the first receiver chain 525-*a* is powered on may be referred to as an awake state or active state of the DRX mode. As part of the DRX mode, the UE 115 may power off the first receiver chain 525-*a* associated with the TRP 510-*a* in resources other than resource set 505-*a* (e.g., in resource set 505-*b*), such as those resources that are not allocated for TRP 510-*a*, and the time during which the first receiver chain 525-*a* is power off may be referred to as a sleep state or an inactive state of the DRX mode. Similarly, the UE 115 may power on and off the second receiver chain 525-*b* associated with TRP 510-*b* as part of a DRX mode of operation with the TRP 510-*b*. In such cases, the UE 115 may be in an awake state to monitor for resource set 505-*b* and be in a sleep state in other resources, such as resource set 505-*a*.

The UE 115 may update the first and second receiver chains 525 within a first refresh interval 530-*a* and a second refresh interval 530-*b*, respectively. If the UE 115 receives a first reference signal in a first time resource in the slot 515-*a* from the TRP 510-*a* and a second reference signal in a second time resource after the ending boundary of the window 520 in the slot 515-*b* from the TRP 510-*b*, a duration between the first and second resources may be larger than the first refresh interval 530-*a*, the second refresh interval 530-*b*, or both. That is, the first receiver chain 525-*a* and/or the second receiver chain 525-*b* may be refreshed at the UE 115. Additionally, or alternatively, the phase continuity between transmissions may be lost. In such cases, the UE 115 may be unable to combine a first channel estimation associated with the TRP 510-*a* with a second channel estimation associated with the TRP 510-*b* to accurately estimate an effective SFN channel.

A duration of the window 520 described herein may be configured to maintain phase continuity across reference signal measurements for SFN communications and support more efficient SFN channel estimation procedures. The duration of the window 520 (e.g., a window size) may be configured to maintain phase continuity between any two reference signals received within the window 520. Additionally, or alternatively, the duration of the window 520 may be longer than a duration of a refresh interval 530 at the UE 115, where the refresh interval 530 may correspond to a time period before a receiver chain 525 at the UE 115 is refreshed, such as the refresh intervals 535-*a* and 535-*b*.

In some examples, the UE 115 may receive a first reference signal from the TRP 510-*a* using a first beam (e.g., a first receiver antenna panel) and a second reference signal from the TRP 510-*b* using a second beam (e.g., a second receiver antenna panel). In such cases, the UE 115 may perform a beam switch during a beam switch duration between reception of the first reference signal and reception of the second reference signal. A duration of the window 520 may be longer than the beam switch duration. As such, the UE 115 may dynamically identify pairings or groupings between reference signals to track as potential candidates for SFN based on the window 520 configured for the UE 115.

The UE 115 may additionally, or alternatively, identify which reference signals to use for SFN operations based on a resource configuration that indicates a relationship or association between resource sets 505 for SFN communications. The UE 115 may be configured with the resource configuration or may receive an indication of the resource configuration via a control message. In some examples, the resource configuration may indicate a modified configuration for one or more resource sets 505 (e.g., TRS resource sets). The resource configuration may indicate two or more subsets of resources within each resource set 505 (e.g., one subset of resources per TRP 510). Each subset of resources may be an example of a resource set 505 for a single TRP 510, which may provide for the UE 115 to perform channel tracking for single TRP and multi-TRP (e.g., SFN) communications. The UE 115 may be configured to track the resources in each subset of resources as potential candidates for an SFN operation based on the resource configuration. The UE 115 may thereby refrain from tracking other reference signal combinations for the SFN operation. In such cases, the UE 115 may receive RRC signaling indicating a configuration of the subsets of resources within each resource set 505. For example, a network node may transmit RRC signaling to the UE 115 to indicate a new resource set 505 including corresponding subsets of resources for each pairing of TRS resources.

In some examples, the resource configuration may indicate an association or pairing between two or more resource sets 505 (e.g., per-TRP TRS resource sets 505). For example, the resource configuration may indicate that the resource set 505-*a* for the TRP 510-*a* is associated with the resource set 505-*b* for the TRP 510-*b* for SFN tracking, as illustrated by the dashed arrow in FIG. 5. The UE 115 may monitor for reference signals received via the resource set 505-*a* and the resource set 505-*b* as potential candidates for an SFN channel estimation (e.g., for HST SFN Scheme 1 tracking). The UE 115 may refrain from tracking reference signals received via other resource sets 505 as potential candidates for the SFN operation. The UE 115 may receive the resource configuration indicating the association between resource sets 505 via RRC signaling, via a MAC-CE, or via some other control signaling that includes one or more fields configured to indicate the association between resource sets.

The UE 115 may thereby perform joint TRS tracking and SFN channel estimation based on a resource configuration for two or more time resources associated with reference signal transmission from two or more TRPs 510. The resource configuration may indicate a window 520, and the UE 115 may track reference signals received within the window 520 for an SFN operation. Additionally, or alternatively, the resource configuration may indicate an association between resource sets 505 or subsets of resources within a resource set 505 for SFN tracking. The resource configuration may provide for dynamic association of TRS resources, reduced overhead, and improved reliability and efficiency for tracking shared SFN channel parameters.

Figure 6:
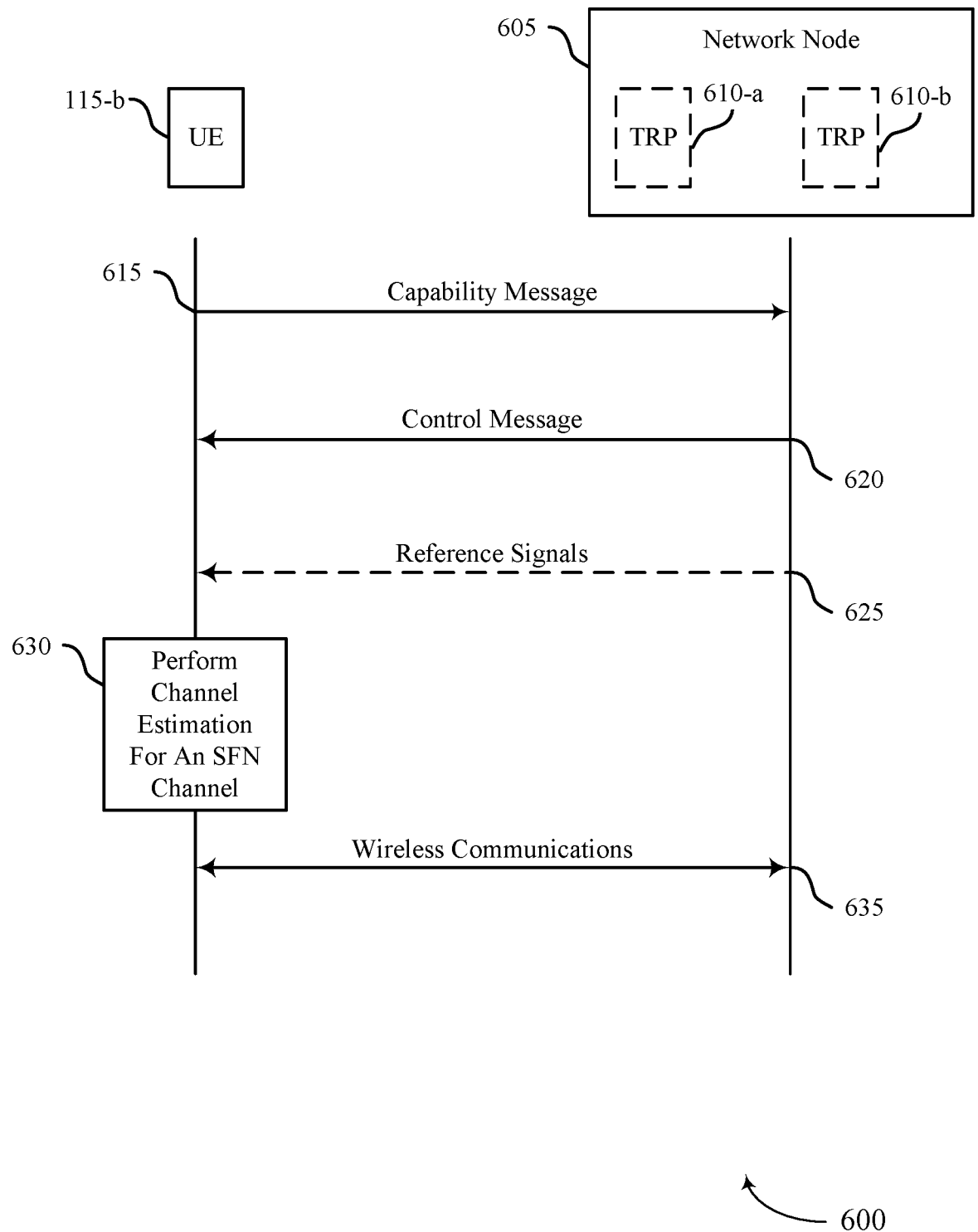
FIG. 6 illustrates an example of a process flow that supports TRS configuration for SFN communications in accordance with one or more aspects of the present disclosure.

FIG. 6 illustrates an example of a process flow 600 that supports TRS configuration for SFN communications in accordance with one or more aspects of the present disclosure. The process flow 600 may implement aspects of the wireless communications systems 100 and 200 or may be implemented by aspects of the wireless communications systems 100 and 200 as described with reference to FIGS. 1 and 2, respectively. For example, the process flow 600 may implement or be implemented by a network node 605 and a UE 115-*b*, which may be examples of a base station or a TRP and a UE as described with reference to FIGS. 1 through 5. The network node 605 may include or be in communication with at least the TRP 610-a and the TRP 610-b.

In the following description of the process flow 600, the operations between the network node 605 and the UE 115-b may be performed in different orders or at different times. Some operations may also be left out of the process flow 600, or other operations may be added. Although the network node 605 and the UE 115-b are shown performing the operations of the process flow 600, some aspects of some operations may also be performed by one or more other wireless devices.

At 615, the UE 115-b may transmit a UE capability message to the network node 605. The UE capability message may indicate support for an SFN configuration. In some examples, the UE capability message may be configured to indicate the support for receiving two or more reference signals in a same time resource. Additionally, or alternatively, the UE capability message may be configured to indicate support for one or more multi-TRP schemes or for an SFN operation, and one or more fields in the UE capability message may be reconfigured to indicate support for receiving two or more reference signals in a same time resource.

At 620, the UE 115-b may receive, from the network node 605, a control message based on the UE capability message. The control message may indicate a resource set that includes one or more resources for reference signal reception from at least two TRPs 610 in accordance with the SFN configuration. The at least two TRPs 610 may include the TRP 610-a and the TRP 610-b of the network node 605.

At 625, in some examples, the UE 115-b may receive one or more reference signals in the one or more resources in accordance with the control message. The one or more reference signals may include a first reference signal received from the TRP 610-a and a second reference signal received from the TRP 610-b.

At 630, the UE 115-b may perform a channel estimation for an SFN channel associated with the TRP 610-a and the TRP 610-b in accordance with the control message. The channel estimation may be based on the first reference signal of the TRP 610-a and the second reference signal of the TRP 610-b in the one or more resources.

At 635, the UE 115-b may communicate with the network node 605 via at least one of the TRP 610-a and the TRP 610-b in accordance with the channel estimation.

Figure 7:
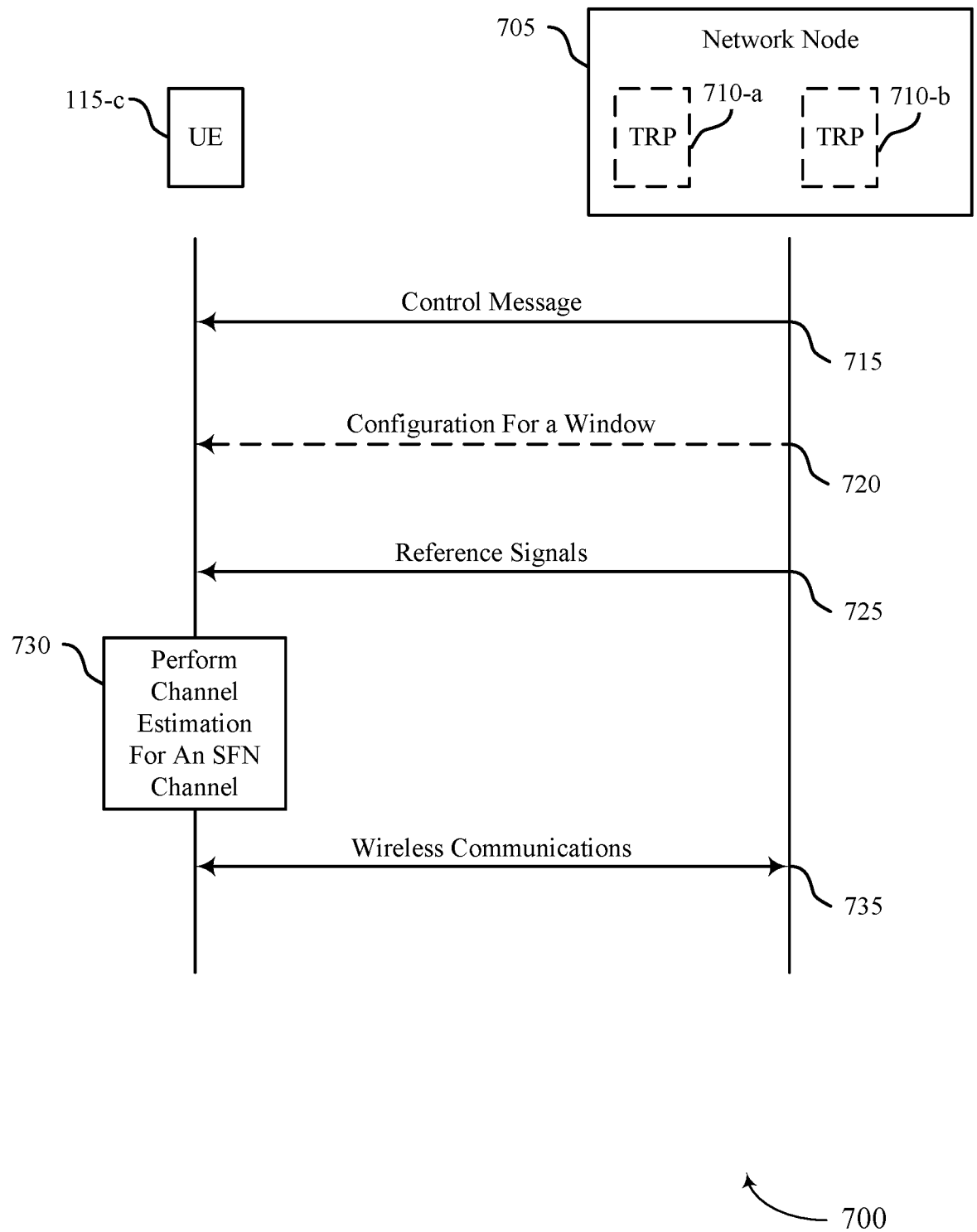
FIG. 7 illustrates an example of a process flow that supports TRS configuration for SFN communications in accordance with one or more aspects of the present disclosure.

FIG. 7 illustrates an example of a process flow 700 that supports TRS configuration for SFN communications in accordance with one or more aspects of the present disclosure. The process flow 700 may implement aspects of the wireless communications systems 100 and 200 or may be implemented by aspects of the wireless communications systems 100 and 200 as described with reference to FIGS. 1 and 2, respectively. For example, the process flow 700 may implement or be implemented by a network node 705 and a UE 115-c, which may be examples of a base station or a TRP and a UE as described with reference to FIGS. 1 through 6. The network node 705 may include or be in communication with at least the TRP 710-a and the TRP 710-b.

In the following description of the process flow 700, the operations between the network node 705 and the UE 115-c may be performed in different orders or at different times. Some operations may also be left out of the process flow 700, or other operations may be added. Although the network node 705 and the UE 115-c are shown performing the operations of the process flow 700, some aspects of some operations may also be performed by one or more other wireless devices.

At 715, the UE 115-c may receive a control message from the network node 705. The control message may indicate a resource configuration for two or more time resources associated with reference signal transmission for at least two TRPs 710 in accordance with an SFN configuration. The at least two TRPs 710 may include the TRP 710-a and the TRP 710-b.

At 720, in some examples, the UE 115-c may receive a configuration for a window associated with the two or more time resources. The configuration for the window may be received via the control message.

At 725, the UE 115-c may receive, via the two or more time resources, one or more reference signals from the network node 705 based on the resource configuration. For example, the UE 115-c may receive a first reference signal from the TRP 710-a and a second reference signal from the TRP 710-b based on the resource configuration.

At 730, the UE 115-c may perform a channel estimation for an SFN channel associated with the TRP 710-a and the TRP 710-b in accordance with the control message. The channel estimation may be based on the first reference signal and the second reference signal. In some examples, the UE 115-c may perform the channel estimation based on the two or more time resources being located within the window. The two or more time resources may include a first time resource associated with the TRP 710-a and a second time resource associated with the TRP 710-b.

Figure 8:
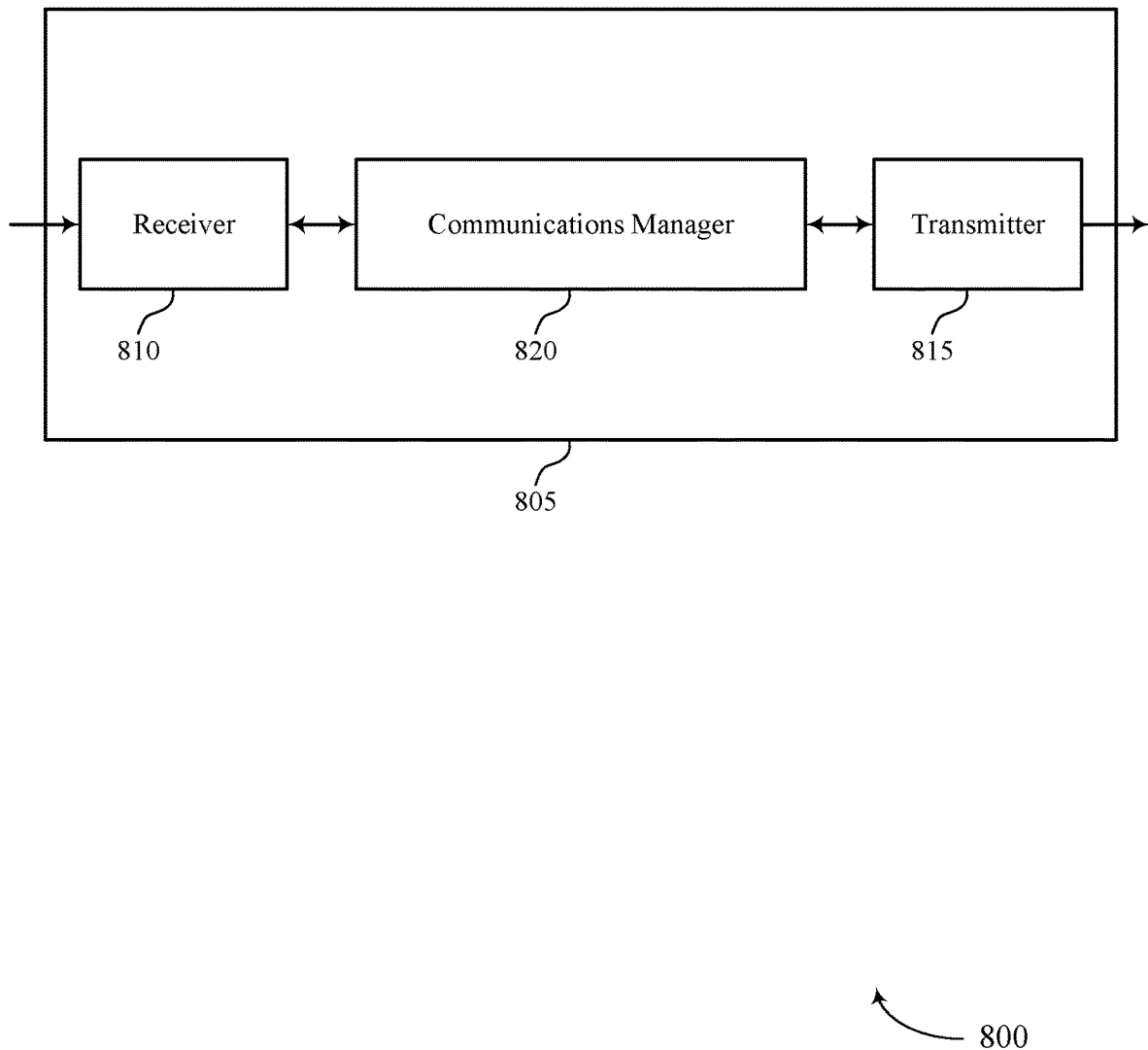
FIGS. 8 and 9 show block diagrams of devices that support TRS configuration for SFN communications in accordance with one or more aspects of the present disclosure.

FIG. 8 shows a block diagram 800 of a device 805 that supports TRS configuration for SFN communications in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to TRS configuration for SFN communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to TRS configuration for SFN communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of TRS configuration for SFN communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for transmitting a UE capability message indicating support for an SFN configuration. The communications manager 820 may be configured as or otherwise support a means for receiving a control message based on the UE capability message, the control message indicating a resource set that includes one or more resources for reference signal reception from at least two TRPs in accordance with the SFN configuration, the at least two TRPs including a first TRP and a second TRP. The communications manager 820 may be configured as or otherwise support a means for performing a channel estimation for an SFN channel associated with the at least two TRPs in accordance with the control message, the channel estimation based on a first reference signal of the first TRP and a second reference signal of the second TRP received in the one or more resources. The communications manager 820 may be configured as or otherwise support a means for communicating with at least one of the first TRP or the second TRP in accordance with the channel estimation.

Additionally, or alternatively, the communications manager 820 may support wireless communications at a UE in accordance with examples as disclosed herein. For example, the communications manager 820 may be configured as or otherwise support a means for receiving a control message indicating a resource configuration for two or more time resources associated with reference signal transmission for at least two TRPs in accordance with an SFN configuration. The communications manager 820 may be configured as or otherwise support a means for receiving, via the two or more time resources, a first reference signal from a first TRP of the at least two TRPs and a second reference signal from a second TRP of the at least two TRPs based on the resource configuration. The communications manager 820 may be configured as or otherwise support a means for performing a channel estimation for an SFN channel associated with the first TRP and the second TRP in accordance with the control message, the channel estimation based on the first reference signal and the second reference signal. The communications manager 820 may be configured as or otherwise support a means for communicating with at least one of the first TRP and the second TRP in accordance with the channel estimation.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources. The device 805 may receive a resource configuration for SFN channel estimation. By monitoring reference signals for a joint SFN channel estimation based on the resource configuration, the processor of the device 805 may refrain from receiving and processing control signaling indicating dynamic pairings between resources, which may reduce processing and power consumption and provide for more efficient utilization of communication resources. Additionally, or alternatively, the processor may perform SFN channel estimation based on a restricted set of TRS resource pairs or groups, which may reduce processing and complexity.

Figure 9:
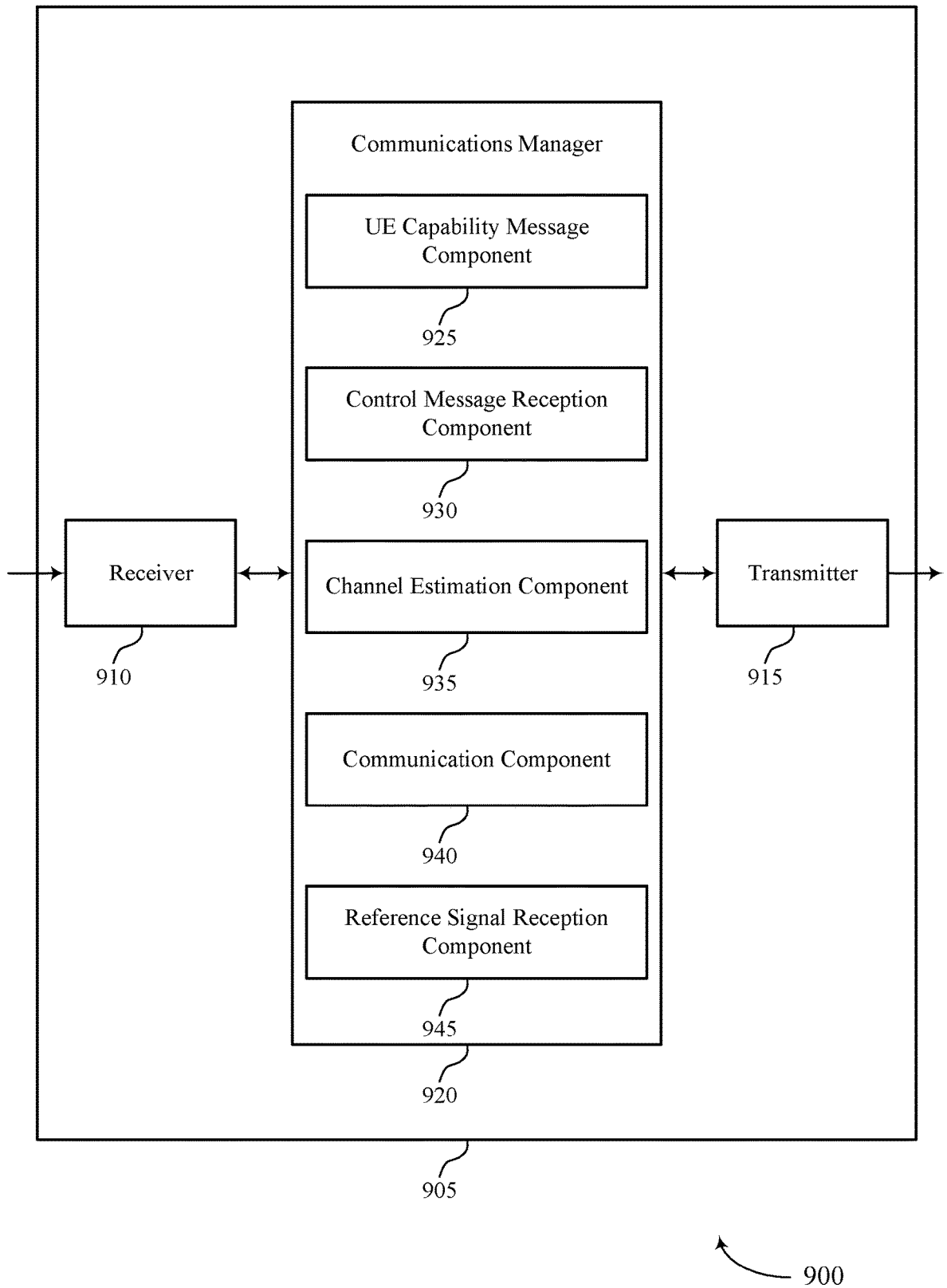

FIG. 9 shows a block diagram 900 of a device 905 that supports TRS configuration for SFN communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to TRS configuration for SFN communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to TRS configuration for SFN communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of TRS configuration for SFN communications as described herein. For example, the communications manager 920 may include a UE capability message component 925, a control message reception component 930, a channel estimation component 935, a communication component 940, a reference signal reception component 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The UE capability message component 925 may be configured as or otherwise support a means for transmitting a UE capability message indicating support for an SFN configuration. The control message reception component 930 may be configured as or otherwise support a means for receiving a control message based on the UE capability message, the control message indicating a resource set that includes one or more resources for reference signal reception from at least two TRPs in accordance with the SFN configuration, the at least two TRPs including a first TRP and a second TRP. The channel estimation component 935 may be configured as or otherwise support a means for performing a channel estimation for an SFN channel associated with the at least two TRPs in accordance with the control message, the channel estimation based on a first reference signal of the first TRP and a second reference signal of the second TRP received in the one or more resources. The communication component 940 may be configured as or otherwise support a means for communicating with at least one of the first TRP or the second TRP in accordance with the channel estimation.

Additionally, or alternatively, the communications manager 920 may support wireless communications at a UE in accordance with examples as disclosed herein. The control message reception component 930 may be configured as or otherwise support a means for receiving a control message indicating a resource configuration for two or more time resources associated with reference signal transmission for at least two TRPs in accordance with an SFN configuration. The reference signal reception component 945 may be configured as or otherwise support a means for receiving, via the two or more time resources, a first reference signal from a first TRP of the at least two TRPs and a second reference signal from a second TRP of the at least two TRPs based on the resource configuration. The channel estimation component 935 may be configured as or otherwise support a means for performing a channel estimation for an SFN channel associated with the first TRP and the second TRP in accordance with the control message, the channel estimation based on the first reference signal and the second reference signal. The communication component 940 may be configured as or otherwise support a means for communicating with at least one of the first TRP and the second TRP in accordance with the channel estimation.

Figure 10:
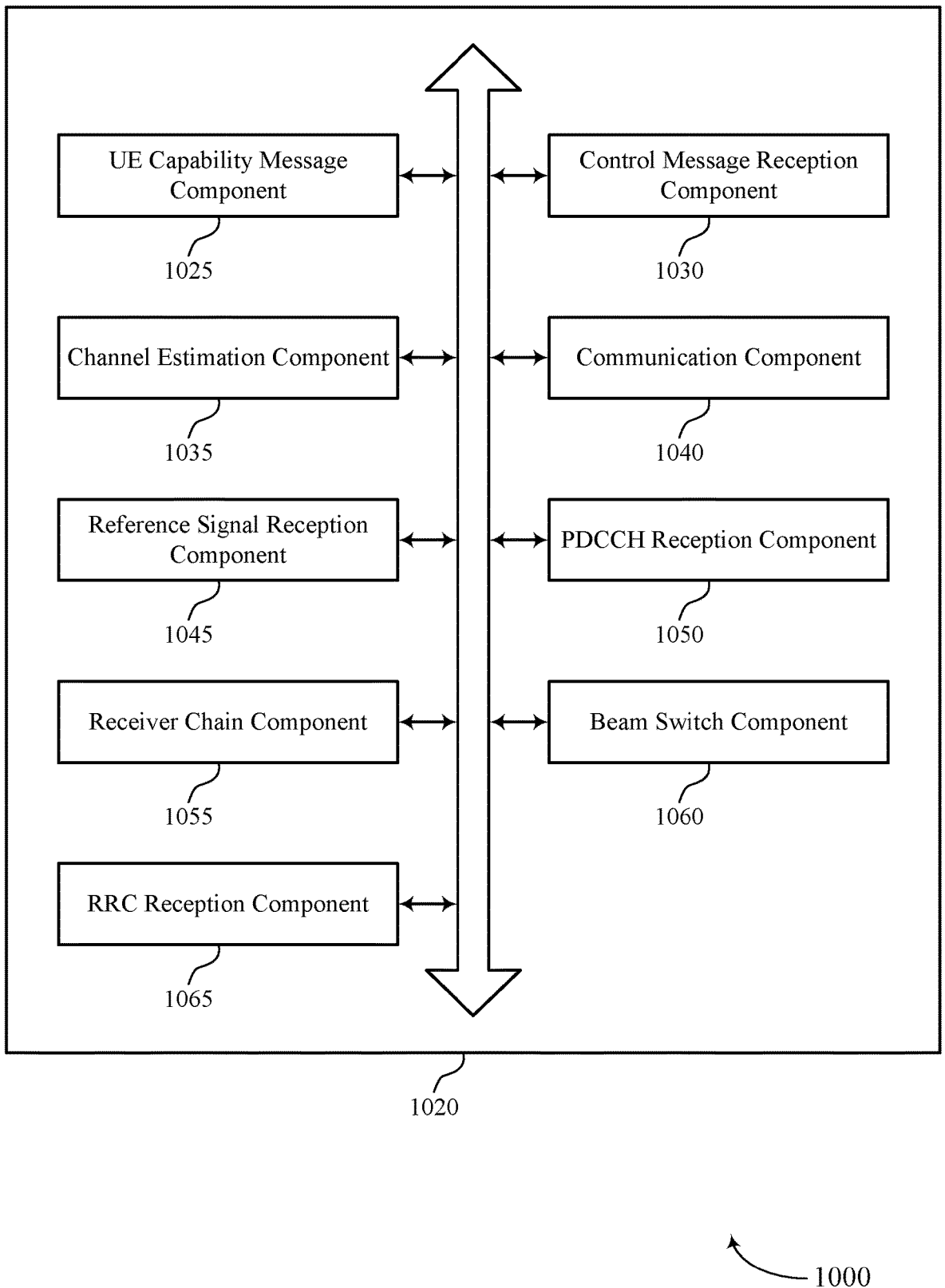
FIG. 10 shows a block diagram of a communications manager that supports TRS configuration for SFN communications in accordance with one or more aspects of the present disclosure.

FIG. 10 shows a block diagram 1000 of a communications manager 1020 that supports TRS configuration for SFN communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of TRS configuration for SFN communications as described herein. For example, the communications manager 1020 may include a UE capability message component 1025, a control message reception component 1030, a channel estimation component 1035, a communication component 1040, a reference signal reception component 1045, a PDCCH reception component 1050, a receiver chain component 1055, a beam switch component 1060, an RRC reception component 1065, or any combination thereof. Each of these components may communicate, directly or indirectly, with one another (e.g., via one or more buses).

The communications manager 1020 may support wireless communications at a UE in accordance with examples as disclosed herein. The UE capability message component 1025 may be configured as or otherwise support a means for transmitting a UE capability message indicating support for an SFN configuration. The control message reception component 1030 may be configured as or otherwise support a means for receiving a control message based on the UE capability message, the control message indicating a resource set that includes one or more resources for reference signal reception from at least two TRPs in accordance with the SFN configuration, the at least two TRPs including a first TRP and a second TRP. The channel estimation component 1035 may be configured as or otherwise support a means for performing a channel estimation for an SFN channel associated with the at least two TRPs in accordance with the control message, the channel estimation based on a first reference signal of the first TRP and a second reference signal of the second TRP received in the one or more resources. The communication component 1040 may be configured as or otherwise support a means for communicating with at least one of the first TRP or the second TRP in accordance with the channel estimation.

In some examples, the reference signal reception component 1045 may be configured as or otherwise support a means for receiving the first reference signal and the second reference signal in the one or more resources, the one or more resources including a first time resource associated with the first TRP and a second time resource associated with the second TRP, where the first time resource and the second time resource are overlapping in a time domain.

In some examples, the reference signal reception component 1045 may be configured as or otherwise support a means for receiving the first reference signal in the first time resource and a first resource element, the first reference signal scrambled according to a first scrambling sequence associated with a first ID of the first TRP. In some examples, the reference signal reception component 1045 may be configured as or otherwise support a means for receiving the second reference signal in the second time resource and the first resource element, the second reference signal scrambled according to a second scrambling sequence associated with a second ID of the second TRP.

In some examples, the reference signal reception component 1045 may be configured as or otherwise support a means for receiving the first reference signal in the first time resource and a first resource element. In some examples, the reference signal reception component 1045 may be configured as or otherwise support a means for receiving the second reference signal in the second time resource and a second resource element that is nonoverlapping with the first resource element in a frequency domain, where the first reference signal and the second reference signal are transmitted according to an FDM or an SDM configuration.

In some examples, the resource set may include a first resource set associated with the first TRP and a second resource set associated with the second TRP, and the channel estimation component 1035 may be configured as or otherwise support a means for performing the channel estimation for the SFN channel based on the first reference signal being received via the first resource set, the second reference signal being received via the second resource set, and the first resource set corresponding to a same periodicity, a same offset, or both, as the second resource set.

In some examples, the resource set may include a first resource set associated with the first TRP and a second resource set associated with the second TRP, and the PDCCH reception component 1050 may be configured as or otherwise support a means for receiving a first downlink control channel scheduling the first reference signal via the first resource set and a second downlink control channel scheduling the second reference signal via the second resource set. In some examples, None, and the channel estimation component 1035 may be configured as or otherwise support a means for performing the channel estimation for the SFN channel based on the first reference signal being received in a first time resource of the first resource set and the second reference signal being received in a second time resource of the second resource set that is overlapping with the first time resource in a time domain.

In some examples, the UE capability message may include a field configured to indicate a UE capability to receive reference signals from the at least two TRPs in a same time resource in accordance with the SFN configuration. In some examples, the UE capability message comprises one or more fields different than the field, the one or more fields indicating support for a multi-TRP communications configuration via a downlink control channel or a downlink shared channel.

In some examples, the reference signal reception component 1045 may be configured as or otherwise support a means for receiving the first reference signal via a first symbol and a first resource element. In some examples, the reference signal reception component 1045 may be configured as or otherwise support a means for receiving the second reference signal via the first symbol and a second resource element, where the one or more resources includes the first symbol, the first resource element, and the second resource element. In some examples, the UE capability message component 1025 may be configured as or otherwise support a means for transmitting the UE capability message indicating support for the SFN configuration based on a frequency offset between the first resource element and the second resource element.

Additionally, or alternatively, the communications manager 1020 may support wireless communications at a UE in accordance with examples as disclosed herein. In some examples, the control message reception component 1030 may be configured as or otherwise support a means for receiving a control message indicating a resource configuration for two or more time resources associated with reference signal transmission for at least two TRPs in accordance with an SFN configuration. The reference signal reception component 1045 may be configured as or otherwise support a means for receiving, via the two or more time resources, a first reference signal from a first TRP of the at least two TRPs and a second reference signal from a second TRP of the at least two TRPs based on the resource configuration. In some examples, the channel estimation component 1035 may be configured as or otherwise support a means for performing a channel estimation for an SFN channel associated with the first TRP and the second TRP in accordance with the control message, the channel estimation based on the first reference signal and the second reference signal. In some examples, the communication component 1040 may be configured as or otherwise support a means for communicating with at least one of the first TRP and the second TRP in accordance with the channel estimation.

In some examples, the control message may indicate a window associated with the two or more time resources, and the channel estimation component 1035 may be configured as or otherwise support a means for performing the channel estimation for the SFN channel based on the two or more time resources being located within the window, the two or more time resources including a first time resource associated with the first TRP and a second time resource associated with the second TRP.

In some examples, the control message indicates a starting boundary of the window relative to a location of the two or more time resources in a time domain. In some examples, the control message reception component 1030 may be configured as or otherwise support a means for receiving the control message via a downlink control channel, the control message indicating a starting boundary of the window relative to a last symbol of the downlink control channel in a time domain.

In some examples, the receiver chain component 1055 may be configured as or otherwise support a means for maintaining a first receiver chain associated with the first TRP and a second receiver chain associated with the second TRP, the first receiver chain corresponding to a first refresh interval and the second receiver chain corresponding to a second refresh interval, where a duration of the window is less than a duration of the first refresh interval and a duration of the second refresh interval.

In some examples, the beam switch component 1060 may be configured as or otherwise support a means for performing a beam switch during a beam switch duration between reception of the first reference signal and reception of the second reference signal, where a duration of the window is greater than the beam switch duration.

In some examples, the window includes one or more resource sets associated with the two or more time resources, the one or more resource sets based on the control message, a periodicity of the two or more time resources, an offset, a capability of the UE, or any combination thereof.

In some examples, the RRC reception component 1065 may be configured as or otherwise support a means for receiving an RRC signal indicating a configuration for the window.

In some examples, the resource configuration indicates a resource set including a first subset of resources associated with the first TRP and a second subset of resources associated with the second TRP, the control message indicating joint tracking between the first subset of resources and the second subset of resources.

In some examples, the control message reception component 1030 may be configured as or otherwise support a means for receiving a second control message indicating separate tracking between the first subset of resources and the second subset of resources. In some examples, the channel estimation component 1035 may be configured as or otherwise support a means for performing a first channel estimation for a first channel associated with the first TRP in accordance with the second control message. In some examples, the channel estimation component 1035 may be configured as or otherwise support a means for performing a second channel estimation for a second channel associated with the second TRP in accordance with the second control message.

In some examples, the control message reception component 1030 may be configured as or otherwise support a means for receiving a control signal indicating a pairing between a first resource set associated with the first TRP and a second resource set associated with the second TRP. In some examples, the channel estimation component 1035 may be configured as or otherwise support a means for performing the channel estimation for the SFN channel based on the control signal.

In some examples, the reference signal reception component 1045 may be configured as or otherwise support a means for receiving the first reference signal via a first time resource of the two or more time resources. In some examples, the reference signal reception component 1045 may be configured as or otherwise support a means for receiving the second reference signal via a second time resource of the two or more time resources that is non-overlapping with the first time resource, the first reference signal and the second reference signal transmitted according to a TDM configuration.

Figure 11:
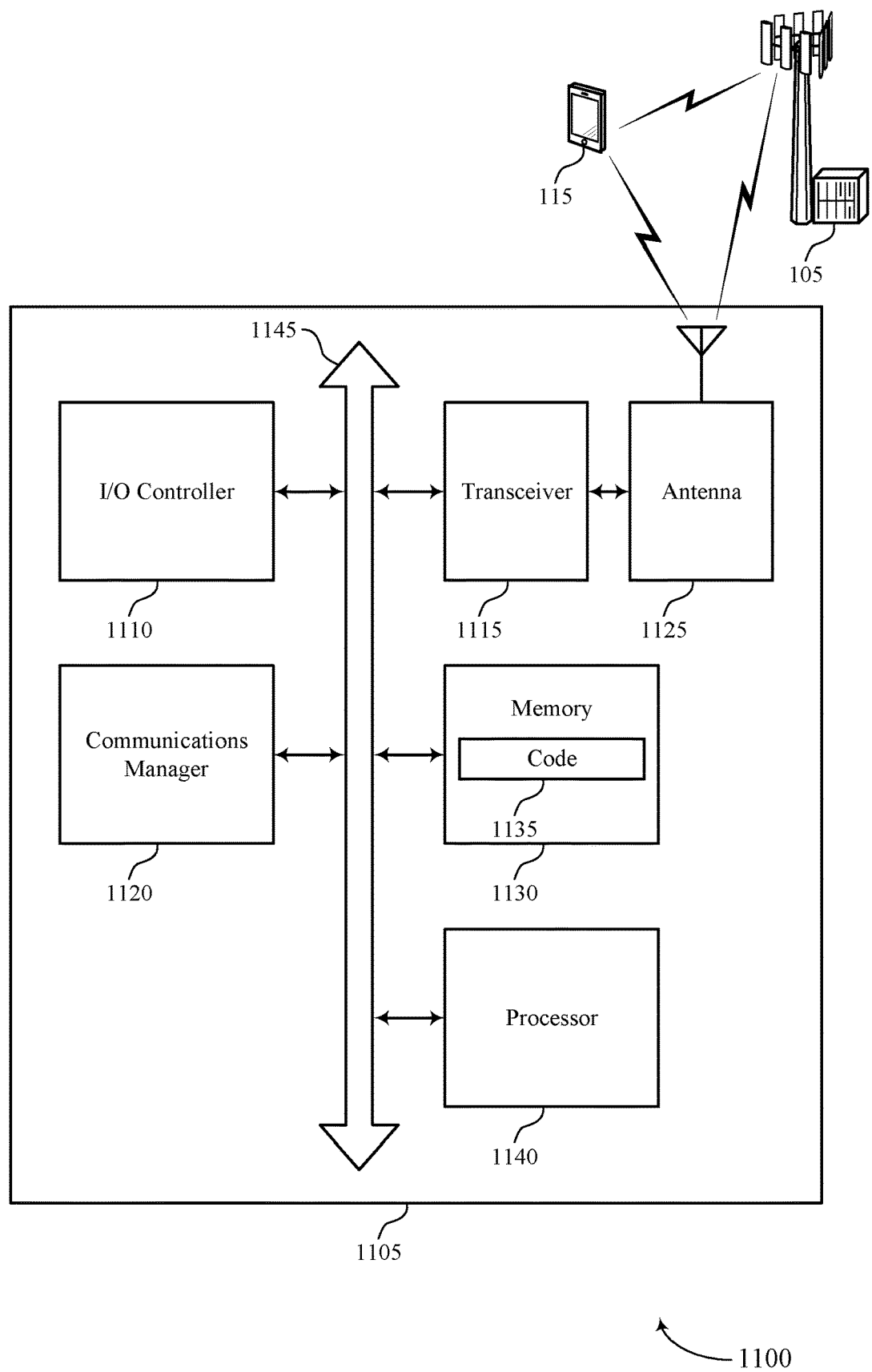
FIG. 11 shows a diagram of a system including a device that supports TRS configuration for SFN communications in accordance with one or more aspects of the present disclosure.

FIG. 11 shows a diagram of a system 1100 including a device 1105 that supports TRS configuration for SFN communications in accordance with one or more aspects of the present disclosure. The device 1105 may be an example of or include the components of a device 805, a device 905, or a UE 115 as described herein. The device 1105 may communicate wirelessly with one or more network nodes 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting TRS configuration for SFN communications). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for transmitting a UE capability message indicating support for an SFN configuration. The communications manager 1120 may be configured as or otherwise support a means for receiving a control message based on the UE capability message, the control message indicating a resource set that includes one or more resources for reference signal reception from at least two TRPs in accordance with the SFN configuration, the at least two TRPs including a first TRP and a second TRP. The communications manager 1120 may be configured as or otherwise support a means for performing a channel estimation for an SFN channel associated with the at least two TRPs in accordance with the control message, the channel estimation based on a first reference signal of the first TRP and a second reference signal of the second TRP received in the one or more resources. The communications manager 1120 may be configured as or otherwise support a means for communicating with at least one of the first TRP or the second TRP in accordance with the channel estimation.

Additionally, or alternatively, the communications manager 1120 may support wireless communications at a UE in accordance with examples as disclosed herein. For example, the communications manager 1120 may be configured as or otherwise support a means for receiving a control message indicating a resource configuration for two or more time resources associated with reference signal reception from at least two TRPs in accordance with an SFN configuration. The communications manager 1120 may be configured as or otherwise support a means for receiving, via the two or more time resources, a first reference signal from a first TRP of the at least two TRPs and a second reference signal from a second TRP of the at least two TRPs based on the resource configuration. The communications manager 1120 may be configured as or otherwise support a means for performing a channel estimation for an SFN channel associated with the first TRP and the second TRP in accordance with the control message, the channel estimation based on the first reference signal and the second reference signal. The communications manager 1120 may be configured as or otherwise support a means for communicating with at least one of the first TRP or the second TRP in accordance with the channel estimation.

By including or configuring the communications manager 1120 in accordance with examples as described herein, the device 1105 may support techniques for improved communication reliability, reduced latency, more efficient utilization of communication resources, improved coordination between devices, and reduced overhead. The device 1105 may receive a resource configuration for joint SFN channel estimation. By identifying associations between resources for SFN communications based on the resource configuration, the device 1105 may refrain from receiving dynamic control signaling, which may support reduced overhead, reduced latency, and more efficient utilization of communication resources. The resource configuration may indicate resources that may be paired for an SFN channel estimation, which may provide for the device 1105 to perform a more accurate estimation of the SFN channel, which may improve coordination between devices and communication reliability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of TRS configuration for SFN communications as described herein, or the processor 1140 and the memory 1130 may be otherwise configured to perform or support such operations.

Figure 12:
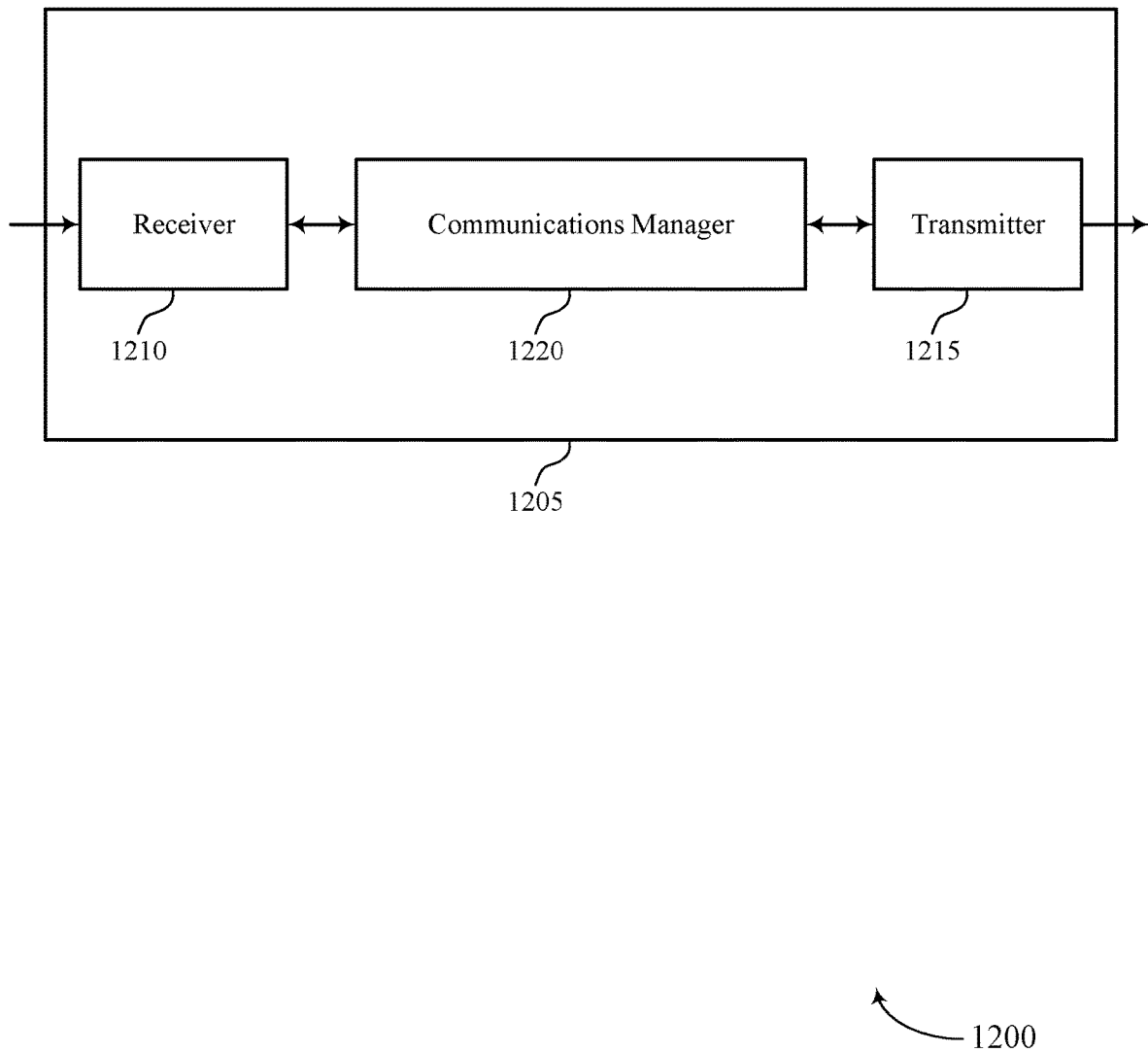
FIGS. 12 and 13 show block diagrams of devices that support TRS configuration for SFN communications in accordance with one or more aspects of the present disclosure.

FIG. 12 shows a block diagram 1200 of a device 1205 that supports TRS configuration for SFN communications in accordance with one or more aspects of the present disclosure. The device 1205 may be an example of aspects of a network node as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to TRS configuration for SFN communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to TRS configuration for SFN communications). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of TRS configuration for SFN communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network node including at least two TRPs in accordance with examples as disclosed herein. For example, the communications manager 1220 may be configured as or otherwise support a means for receiving, from a UE, a UE capability message indicating support for an SFN configuration. The communications manager 1220 may be configured as or otherwise support a means for transmitting, to the UE, a control message based on the UE capability message, the control message indicating a resource set that includes one or more resources for reference signal reception from the at least two TRPs in accordance with the SFN configuration, the at least two TRPs including a first TRP and a second TRP. The communications manager 1220 may be configured as or otherwise support a means for transmitting, to the UE in the one or more resources, a first reference signal of the first TRP and a second reference signal of the second TRP. The communications manager 1220 may be configured as or otherwise support a means for communicating with the UE using at least one of the first TRP and the second TRP in accordance with an SFN channel associated with the at least two TRPs.

Additionally, or alternatively, the communications manager 1220 may support wireless communications at a network node including at least two TRPs in accordance with examples as disclosed herein. For example, the communications manager 1220 may be configured as or otherwise support a means for transmitting, to a UE, a control message indicating a resource configuration for two or more time resources associated with reference signal reception from the at least two TRPs in accordance with an SFN configuration. The communications manager 1220 may be configured as or otherwise support a means for transmitting, to the UE via the two or more time resources, a first reference signal from a first TRP of the at least two TRPs and a second reference signal from a second TRP of the at least two TRPs based on the resource configuration. The communications manager 1220 may be configured as or otherwise support a means for communicating with the UE using at least one of the first TRP or the second TRP in accordance with the SFN configuration.

Figure 13:
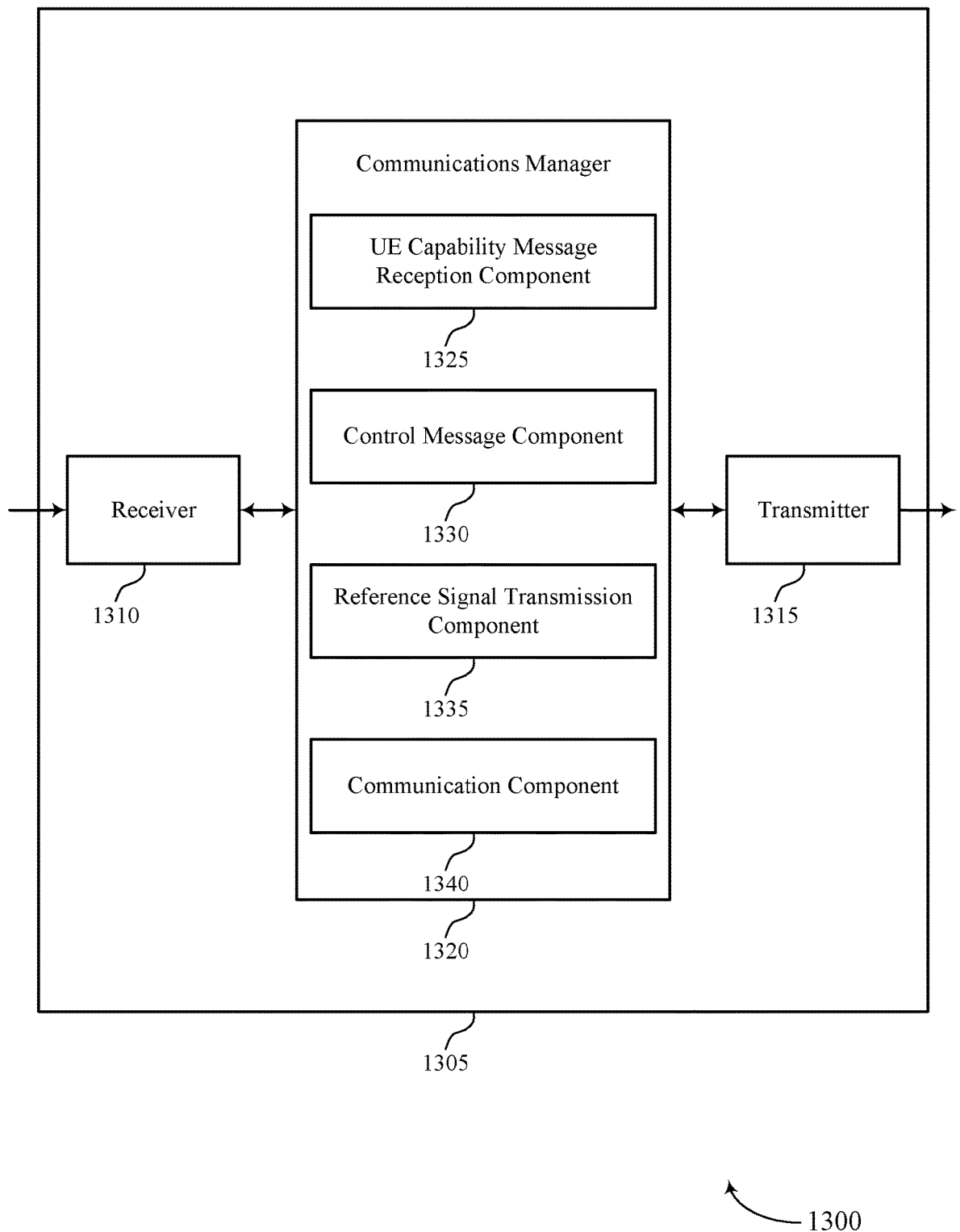

FIG. 13 shows a block diagram 1300 of a device 1305 that supports TRS configuration for SFN communications in accordance with one or more aspects of the present disclosure. The device 1305 may be an example of aspects of a device 1205 or a network node as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to TRS configuration for SFN communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to TRS configuration for SFN communications). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of TRS configuration for SFN communications as described herein. For example, the communications manager 1320 may include a UE capability message reception component 1325, a control message component 1330, a reference signal transmission component 1335, a communication component 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a network node including at least two TRPs in accordance with examples as disclosed herein. The UE capability message reception component 1325 may be configured as or otherwise support a means for receiving, from a UE, a UE capability message indicating support for an SFN configuration. The control message component 1330 may be configured as or otherwise support a means for transmitting, to the UE, a control message based on the UE capability message, the control message indicating a resource set that includes one or more resources for reference signal reception from the at least two TRPs in accordance with the SFN configuration, the at least two TRPs including a first TRP and a second TRP. The reference signal transmission component 1335 may be configured as or otherwise support a means for transmitting, to the UE in the one or more resources, a first reference signal of the first TRP and a second reference signal of the second TRP. The communication component 1340 may be configured as or otherwise support a means for communicating with the UE using at least one of the first TRP and the second TRP in accordance with an SFN channel associated with the at least two TRPs.

Additionally, or alternatively, the communications manager 1320 may support wireless communications at a network node including at least two TRPs in accordance with examples as disclosed herein. The control message component 1330 may be configured as or otherwise support a means for transmitting, to a UE, a control message indicating a resource configuration for two or more time resources associated with reference signal reception from the at least two TRPs in accordance with an SFN configuration. The reference signal transmission component 1335 may be configured as or otherwise support a means for transmitting, to the UE via the two or more time resources, a first reference signal from a first TRP of the at least two TRPs and a second reference signal from a second TRP of the at least two TRPs based on the resource configuration. The communication component 1340 may be configured as or otherwise support a means for communicating with the UE using at least one of the first TRP or the second TRP in accordance with the SFN configuration.

Figure 14:
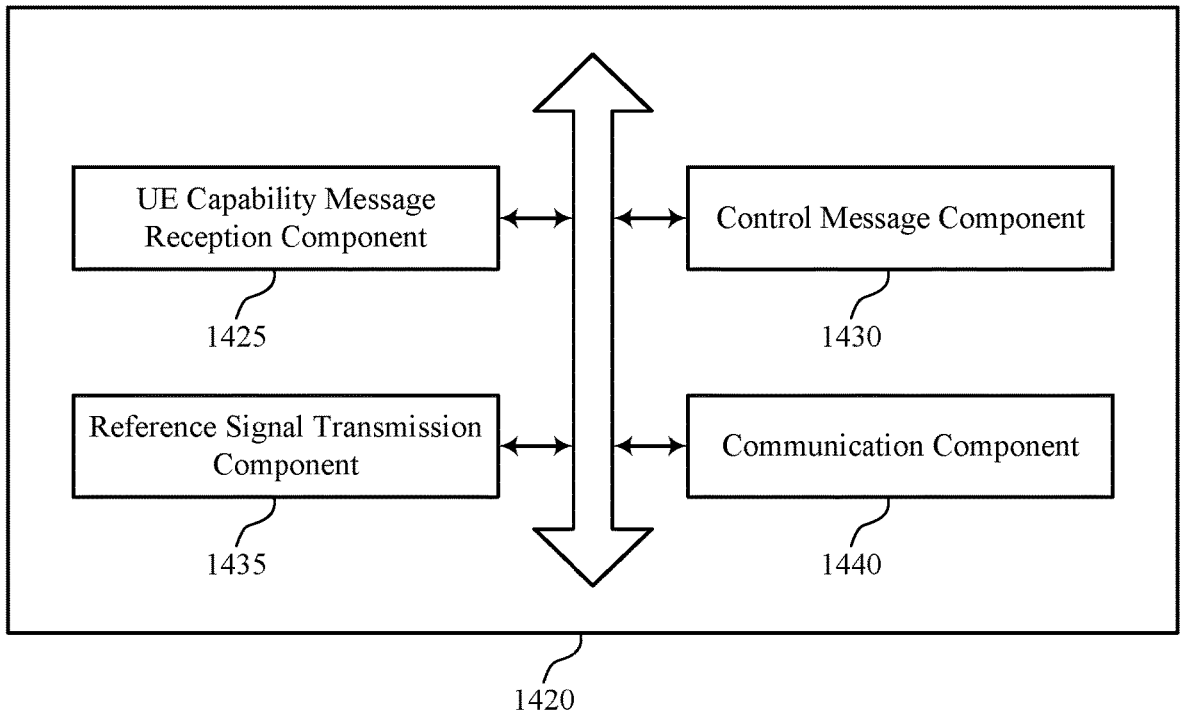
FIG. 14 shows a block diagram of a communications manager that supports TRS configuration for SFN communications in accordance with one or more aspects of the present disclosure.

FIG. 14 shows a block diagram 1400 of a communications manager 1420 that supports TRS configuration for SFN communications in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of TRS configuration for SFN communications as described herein. For example, the communications manager 1420 may include a UE capability message reception component 1425, a control message component 1430, a reference signal transmission component 1435, a communication component 1440, or any combination thereof. Each of these components may communicate, directly or indirectly, with one another (e.g., via one or more buses).

The communications manager 1420 may support wireless communications at a network node including at least two TRPs in accordance with examples as disclosed herein. The UE capability message reception component 1425 may be configured as or otherwise support a means for receiving, from a UE, a UE capability message indicating support for an SFN configuration. The control message component 1430 may be configured as or otherwise support a means for transmitting, to the UE, a control message based on the UE capability message, the control message indicating a resource set that includes one or more resources for reference signal reception from the at least two TRPs in accordance with the SFN configuration, the at least two TRPs including a first TRP and a second TRP. The reference signal transmission component 1435 may be configured as or otherwise support a means for transmitting, to the UE in the one or more resources, a first reference signal of the first TRP and a second reference signal of the second TRP. The communication component 1440 may be configured as or otherwise support a means for communicating with the UE using at least one of the first TRP and the second TRP in accordance with an SFN channel associated with the at least two TRPs.

In some examples, the reference signal transmission component 1435 may be configured as or otherwise support a means for transmitting the first reference signal and the second reference signal to the UE in the one or more resources, the one or more resources including a first time resource associated with the first TRP and a second time resource associated with the second TRP, where the first time resource and the second time resource are overlapping in a time domain.

In some examples, the reference signal transmission component 1435 may be configured as or otherwise support a means for transmitting the first reference signal in the first time resource and a first resource element, the first reference signal scrambled according to a first scrambling sequence associated with the first TRP. In some examples, the reference signal transmission component 1435 may be configured as or otherwise support a means for transmitting the second reference signal in the second time resource and the first resource element, the second reference signal scrambled according to a second scrambling sequence associated with the second TRP, the first time resource and the second time resource corresponding to a same symbol.

In some examples, the reference signal transmission component 1435 may be configured as or otherwise support a means for transmitting the first reference signal in the first time resource and a first resource element. In some examples, the reference signal transmission component 1435 may be configured as or otherwise support a means for transmitting the second reference signal in the second time resource and a second resource element that is nonoverlapping with the first resource element in a frequency domain, the first time resource and the second time resource corresponding to a same symbol, where the first reference signal and the second reference signal are transmitted according to an FDM or an SDM configuration.

Additionally, or alternatively, the communications manager 1420 may support wireless communications at a network node including at least two TRPs in accordance with examples as disclosed herein. In some examples, the control message component 1430 may be configured as or otherwise support a means for transmitting, to a UE, a control message indicating a resource configuration for two or more time resources associated with reference signal reception from the at least two TRPs in accordance with an SFN configuration. In some examples, the reference signal transmission component 1435 may be configured as or otherwise support a means for transmitting, to the UE via the two or more time resources, a first reference signal from a first TRP of the at least two TRPs and a second reference signal from a second TRP of the at least two TRPs based on the resource configuration. In some examples, the communication component 1440 may be configured as or otherwise support a means for communicating with the UE using at least one of the first TRP or the second TRP in accordance with the SFN configuration.

In some examples, the control message indicates a window associated with the two or more time resources. In some examples, the control message indicates a starting boundary of the window relative to a location of the two or more time resources in a time domain.

In some examples, the control message component 1430 may be configured as or otherwise support a means for transmitting the control message via a downlink control channel, the control message indicating a starting boundary of the window relative to a last symbol of the downlink control channel in a time domain. In some examples, a duration of the window is greater than a beam switch duration associated with a beam switch performed by the UE.

Figure 15:
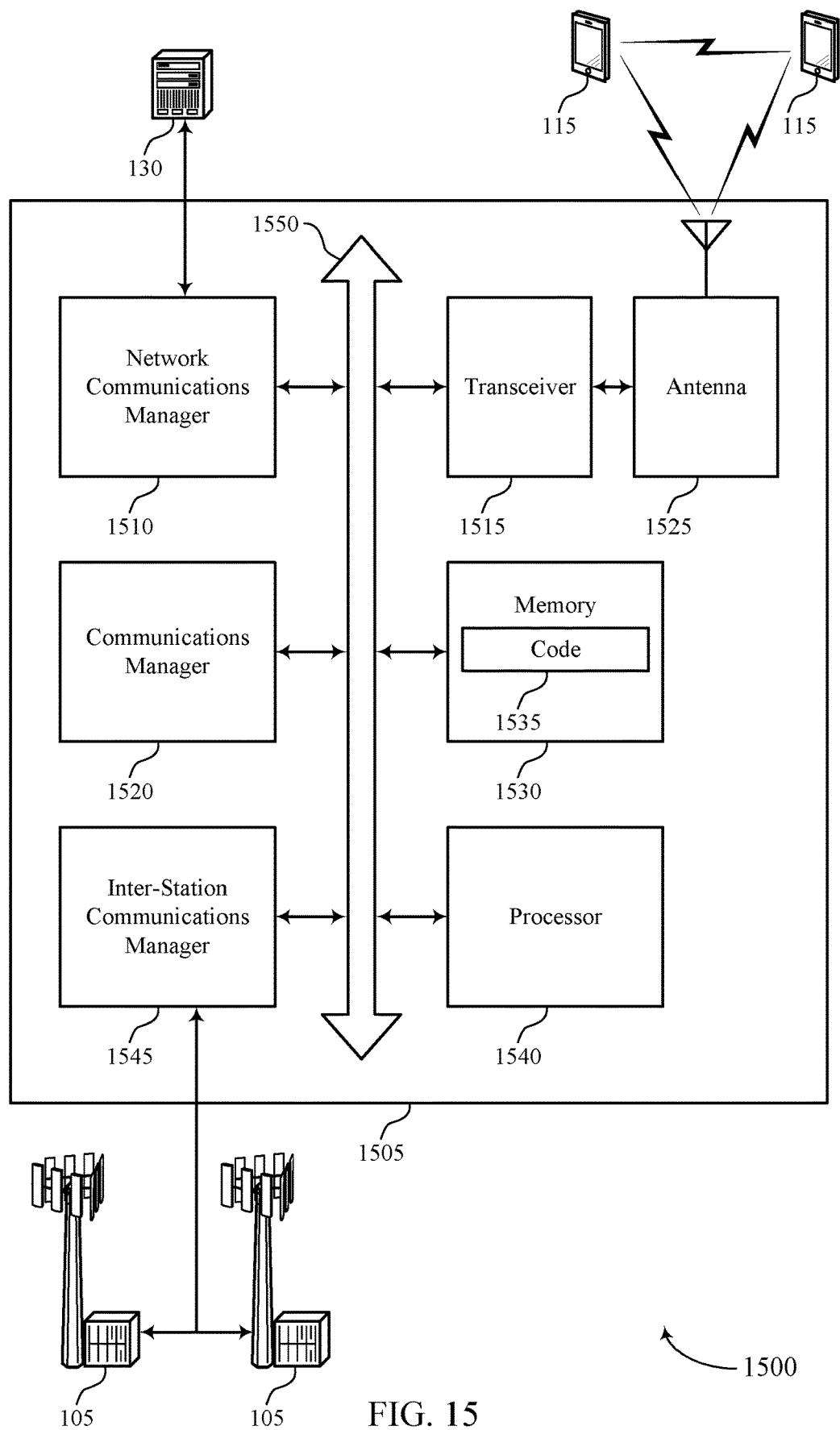
FIG. 15 shows a diagram of a system including a device that supports TRS configuration for SFN communications in accordance with one or more aspects of the present disclosure.

FIG. 15 shows a diagram of a system 1500 including a device 1505 that supports TRS configuration for SFN communications in accordance with one or more aspects of the present disclosure. The device 1505 may be an example of or include the components of a device 1205, a device 1305, or a network node as described herein. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting TRS configuration for SFN communications). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other network nodes 105, and may include a controller or scheduler for controlling communications with UEs 115 in cooperation with other network nodes 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between network nodes 105.

The communications manager 1520 may support wireless communications at a network node including at least two TRPs in accordance with examples as disclosed herein. For example, the communications manager 1520 may be configured as or otherwise support a means for receiving, from a UE, a UE capability message indicating support for an SFN configuration. The communications manager 1520 may be configured as or otherwise support a means for transmitting, to the UE, a control message based on the UE capability message, the control message indicating a resource set that includes one or more resources for reference signal reception from the at least two TRPs in accordance with the SFN configuration, the at least two TRPs including a first TRP and a second TRP. The communications manager 1520 may be configured as or otherwise support a means for transmitting, to the UE in the one or more resources, a first reference signal of the first TRP and a second reference signal of the second TRP. The communications manager 1520 may be configured as or otherwise support a means for communicating with the UE using at least one of the first TRP and the second TRP in accordance with an SFN channel associated with the at least two TRPs.

Additionally, or alternatively, the communications manager 1520 may support wireless communications at a network node including at least two TRPs in accordance with examples as disclosed herein. For example, the communications manager 1520 may be configured as or otherwise support a means for transmitting, to a UE, a control message indicating a resource configuration for two or more time resources associated with reference signal reception from the at least two TRPs in accordance with an SFN configuration. The communications manager 1520 may be configured as or otherwise support a means for transmitting, to the UE via the two or more time resources, a first reference signal from a first TRP of the at least two TRPs and a second reference signal from a second TRP of the at least two TRPs based on the resource configuration. The communications manager 1520 may be configured as or otherwise support a means for communicating with the UE using at least one of the first TRP or the second TRP in accordance with the SFN configuration.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of TRS configuration for SFN communications as described herein, or the processor 1540 and the memory 1530 may be otherwise configured to perform or support such operations.

Figure 16:
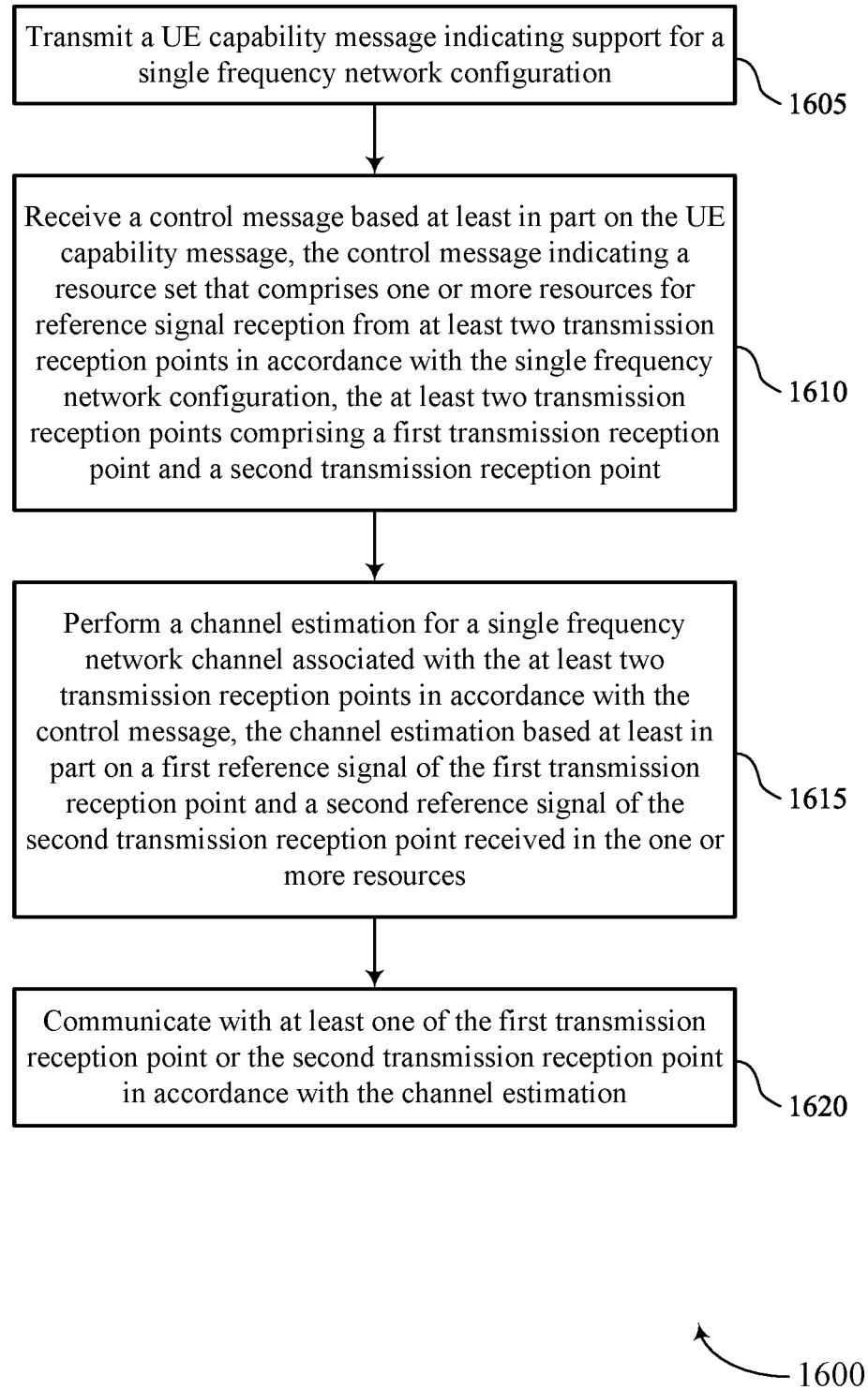
FIGS. 16 through 21 show flowcharts illustrating methods that support TRS configuration for SFN communications in accordance with one or more aspects of the present disclosure.

FIG. 16 shows a flowchart illustrating a method 1600 that supports TRS configuration for SFN communications in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting a UE capability message indicating support for an SFN configuration. The operations of 1605 may be performed in accordance with examples as disclosed herein. In some examples, aspects of the operations of 1605 may be performed by a UE capability message component 1025 as described with reference to FIG. 10.

At 1610, the method may include receiving a control message based on the UE capability message, the control message indicating a resource set that includes one or more resources for reference signal reception from at least two TRPs in accordance with the SFN configuration, the at least two TRPs including a first TRP and a second TRP. The operations of 1610 may be performed in accordance with examples as disclosed herein. In some examples, aspects of the operations of 1610 may be performed by a control message reception component 1030 as described with reference to FIG. 10.

At 1615, the method may include performing a channel estimation for an SFN channel associated with the at least two TRPs in accordance with the control message, the channel estimation based on a first reference signal of the first TRP and a second reference signal of the second TRP received in the one or more resources. The operations of 1615 may be performed in accordance with examples as disclosed herein. In some examples, aspects of the operations of 1615 may be performed by a channel estimation component 1035 as described with reference to FIG. 10.

At 1620, the method may include communicating with at least one of the first TRP or the second TRP in accordance with the channel estimation. The operations of 1620 may be performed in accordance with examples as disclosed herein. In some examples, aspects of the operations of 1620 may be performed by a communication component 1040 as described with reference to FIG. 10.

Figure 17:
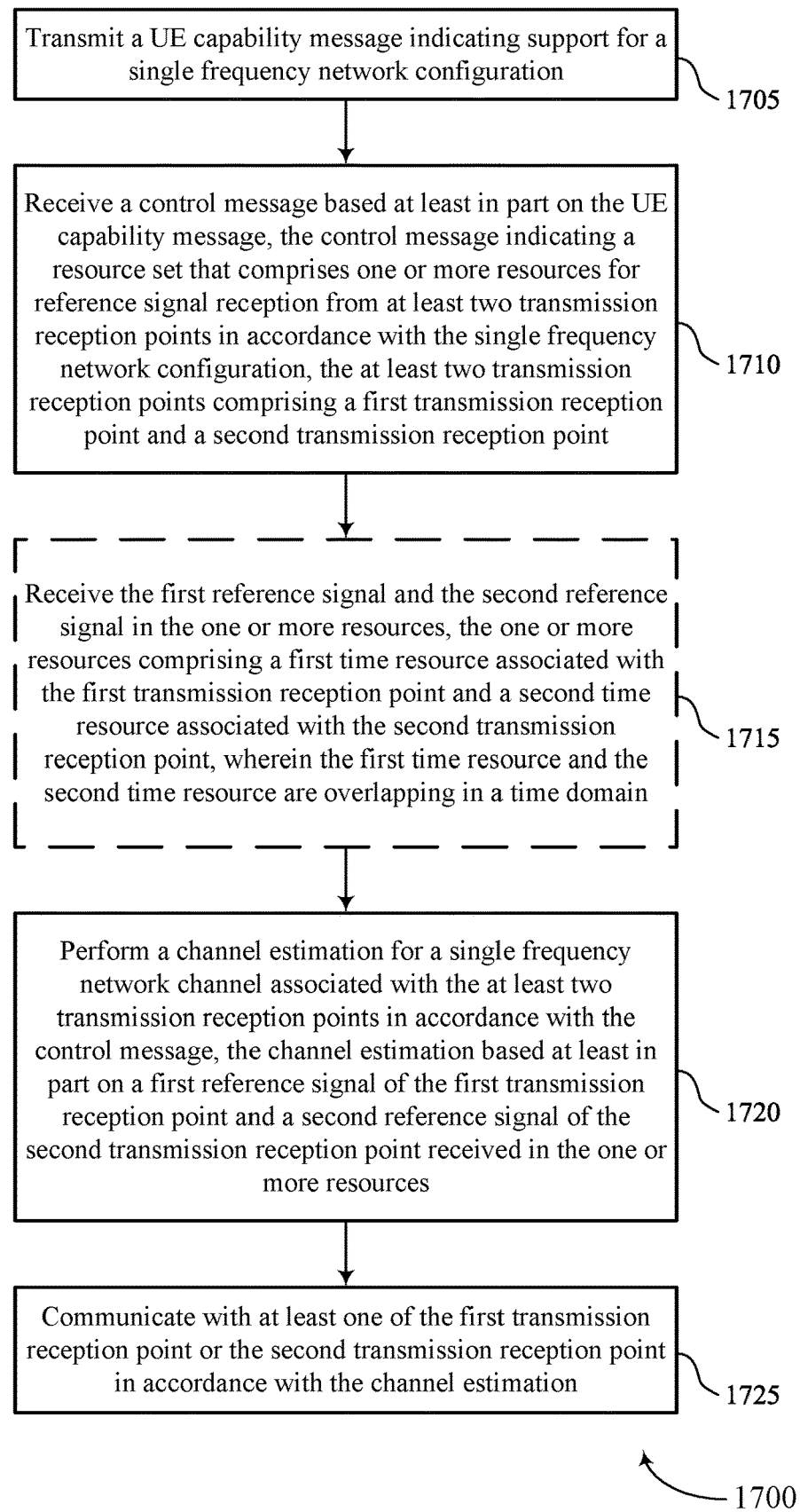

FIG. 17 shows a flowchart illustrating a method 1700 that supports TRS configuration for SFN communications in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include transmitting a UE capability message indicating support for an SFN configuration. The operations of 1705 may be performed in accordance with examples as disclosed herein. In some examples, aspects of the operations of 1705 may be performed by a UE capability message component 1025 as described with reference to FIG. 10.

At 1710, the method may include receiving a control message based on the UE capability message, the control message indicating a resource set that includes one or more resources for reference signal reception from at least two TRPs in accordance with the SFN configuration, the at least two TRPs including a first TRP and a second TRP. The operations of 1710 may be performed in accordance with examples as disclosed herein. In some examples, aspects of the operations of 1710 may be performed by a control message reception component 1030 as described with reference to FIG. 10.

At 1715, in some examples, the method may include receiving the first reference signal and the second reference signal in the one or more resources, the one or more resources including a first time resource associated with the first TRP and a second time resource associated with the second TRP, where the first time resource and the second time resource are overlapping in a time domain. The operations of 1715 may be performed in accordance with examples as disclosed herein. In some examples, aspects of the operations of 1715 may be performed by a reference signal reception component 1045 as described with reference to FIG. 10.

At 1720, the method may include performing a channel estimation for an SFN channel associated with the at least two TRPs in accordance with the control message, the channel estimation based on a first reference signal of the first TRP and a second reference signal of the second TRP received in the one or more resources. The operations of 1720 may be performed in accordance with examples as disclosed herein. In some examples, aspects of the operations of 1720 may be performed by a channel estimation component 1035 as described with reference to FIG. 10.

At 1725, the method may include communicating with at least one of the first TRP or the second TRP in accordance with the channel estimation. The operations of 1725 may be performed in accordance with examples as disclosed herein. In some examples, aspects of the operations of 1725 may be performed by a communication component 1040 as described with reference to FIG. 10.

Figure 18:
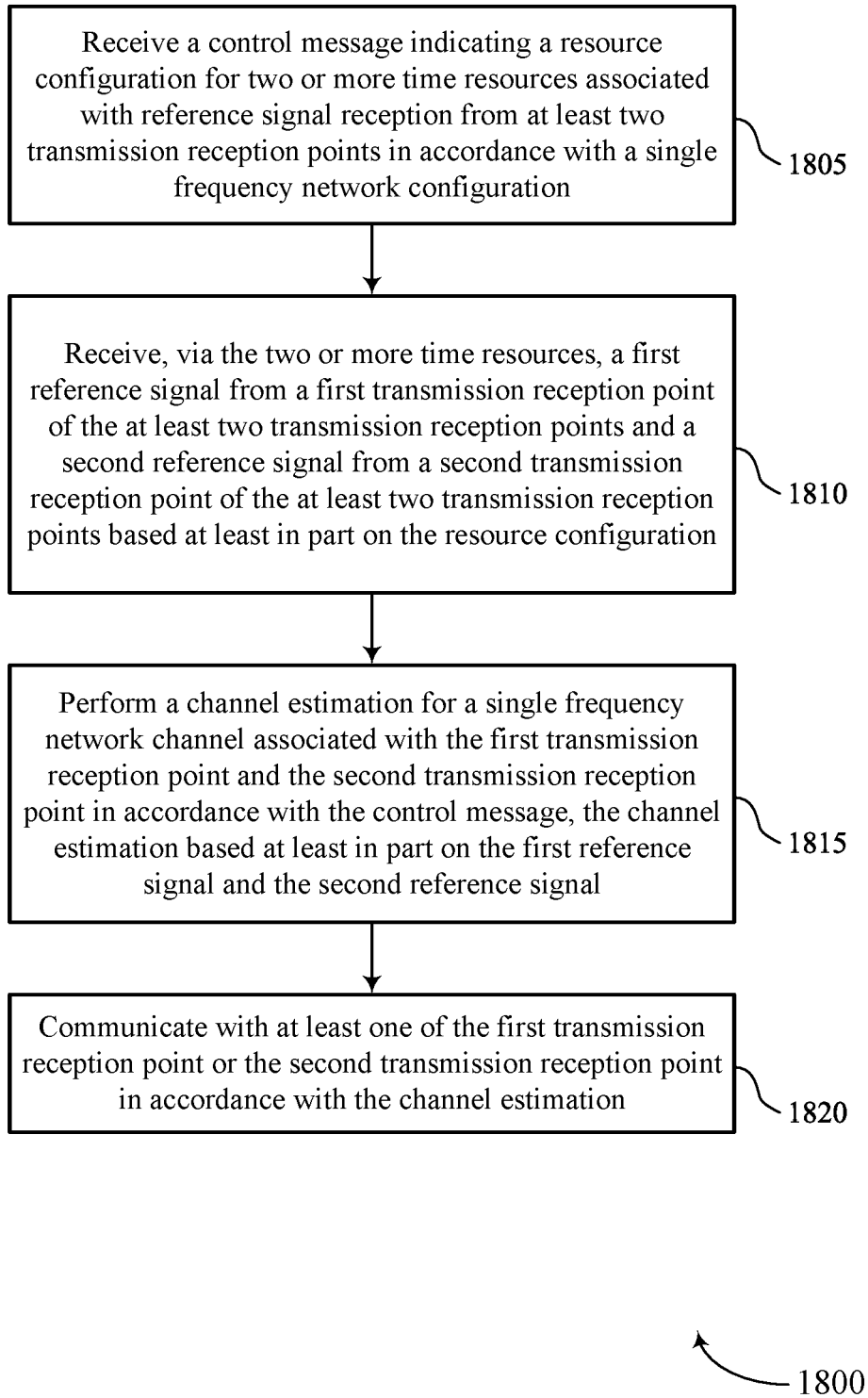

FIG. 18 shows a flowchart illustrating a method 1800 that supports TRS configuration for SFN communications in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a control message indicating a resource configuration for two or more time resources associated with reference signal reception from at least two TRPs in accordance with an SFN configuration. The operations of 1805 may be performed in accordance with examples as disclosed herein. In some examples, aspects of the operations of 1805 may be performed by a control message reception component 1030 as described with reference to FIG. 10.

At 1810, the method may include receiving, via the two or more time resources, a first reference signal from a first TRP of the at least two TRPs and a second reference signal from a second TRP of the at least two TRPs based on the resource configuration. The operations of 1810 may be performed in accordance with examples as disclosed herein. In some examples, aspects of the operations of 1810 may be performed by a reference signal reception component 1045 as described with reference to FIG. 10.

At 1815, the method may include performing a channel estimation for an SFN channel associated with the first TRP and the second TRP in accordance with the control message, the channel estimation based on the first reference signal and the second reference signal. The operations of 1815 may be performed in accordance with examples as disclosed herein. In some examples, aspects of the operations of 1815 may be performed by a channel estimation component 1035 as described with reference to FIG. 10.

At 1820, the method may include communicating with at least one of the first TRP or the second TRP in accordance with the channel estimation. The operations of 1820 may be performed in accordance with examples as disclosed herein. In some examples, aspects of the operations of 1820 may be performed by a communication component 1040 as described with reference to FIG. 10.

Figure 19:
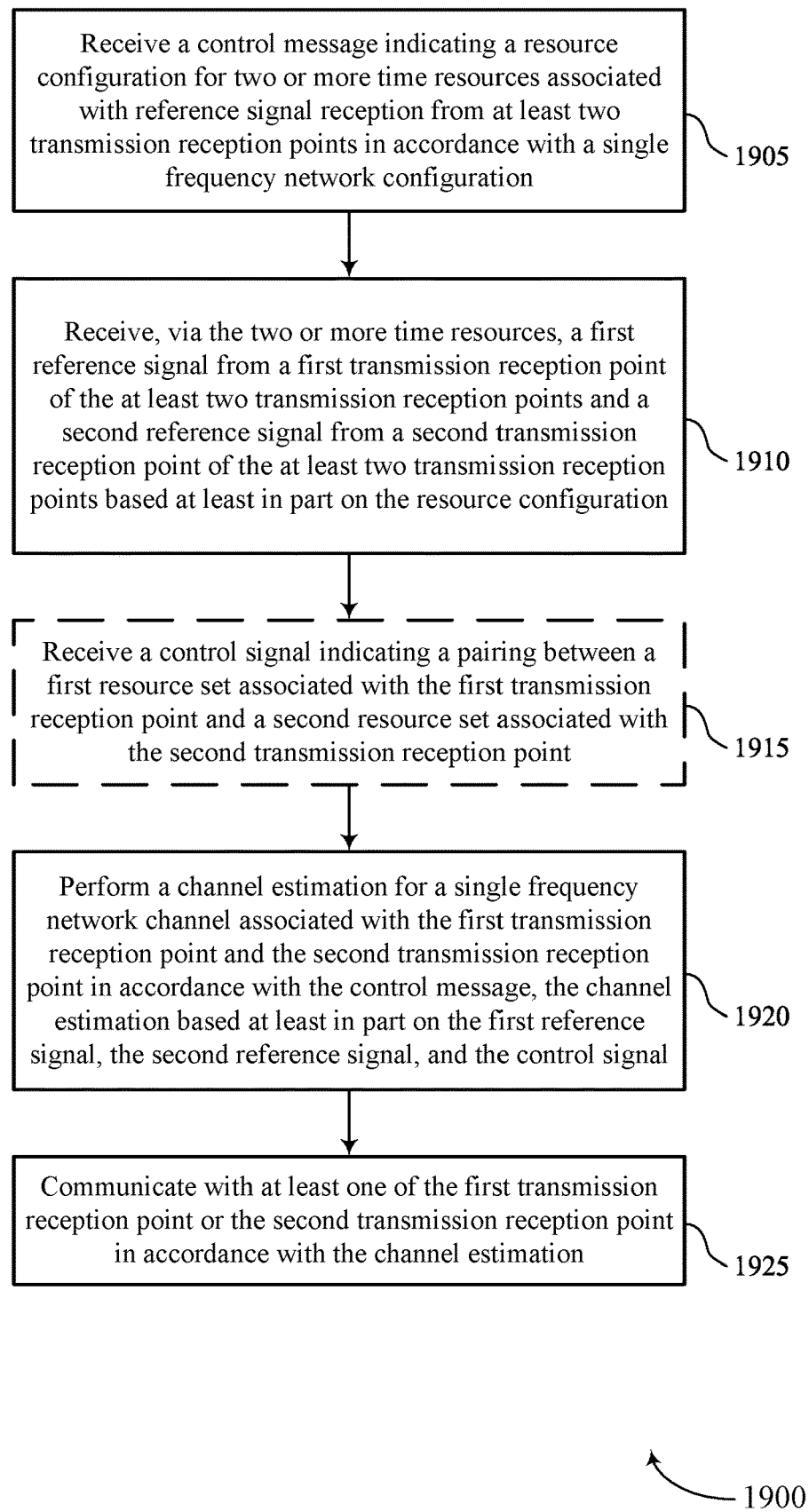

FIG. 19 shows a flowchart illustrating a method 1900 that supports TRS configuration for SFN communications in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving a control message indicating a resource configuration for two or more time resources associated with reference signal reception from at least two TRPs in accordance with an SFN configuration. The operations of 1905 may be performed in accordance with examples as disclosed herein. In some examples, aspects of the operations of 1905 may be performed by a control message reception component 1030 as described with reference to FIG. 10.

At 1910, the method may include receiving, via the two or more time resources, a first reference signal from a first TRP of the at least two TRPs and a second reference signal from a second TRP of the at least two TRPs based on the resource configuration. The operations of 1910 may be performed in accordance with examples as disclosed herein. In some examples, aspects of the operations of 1910 may be performed by a reference signal reception component 1045 as described with reference to FIG. 10.

At 1915, in some examples, the method may include receiving a control signal indicating a pairing between a first resource set associated with the first TRP and a second resource set associated with the second TRP. The operations of 1915 may be performed in accordance with examples as disclosed herein. In some examples, aspects of the operations of 1915 may be performed by a control message reception component 1030 as described with reference to FIG. 10.

At 1920, the method may include performing a channel estimation for an SFN channel associated with the first TRP and the second TRP in accordance with the control message, the channel estimation based on the first reference signal, the second reference signal, and the control signal. The operations of 1920 may be performed in accordance with examples as disclosed herein. In some examples, aspects of the operations of 1920 may be performed by a channel estimation component 1035 as described with reference to FIG. 10.

At 1925, the method may include communicating with at least one of the first TRP or the second TRP in accordance with the channel estimation. The operations of 1925 may be performed in accordance with examples as disclosed herein. In some examples, aspects of the operations of 1925 may be performed by a communication component 1040 as described with reference to FIG. 10.

Figure 20:
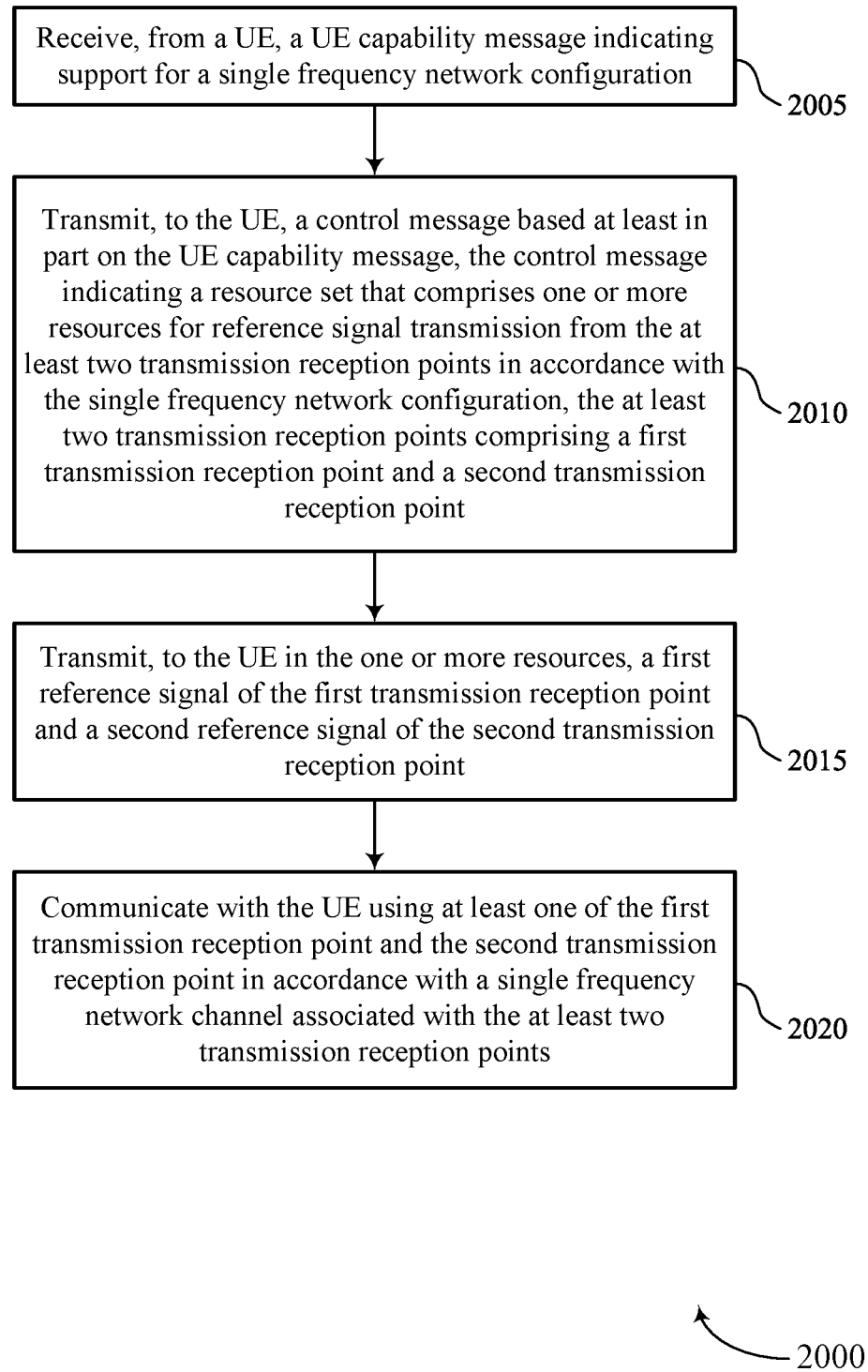

FIG. 20 shows a flowchart illustrating a method 2000 that supports TRS configuration for SFN communications in accordance with one or more aspects of the present disclosure. The operations of the method 2000 may be implemented by a network node or its components as described herein. For example, the operations of the method 2000 may be performed by a network node as described with reference to FIGS. 1 through 7 and 12 through 15. In some examples, a network node may execute a set of instructions to control the functional elements of the network node to perform the described functions. Additionally, or alternatively, the network node may perform aspects of the described functions using special-purpose hardware.

At 2005, the method may include receiving, from a UE, a UE capability message indicating support for an SFN configuration. The operations of 2005 may be performed in accordance with examples as disclosed herein. In some examples, aspects of the operations of 2005 may be performed by a UE capability message reception component 1425 as described with reference to FIG. 14.

At 2010, the method may include transmitting, to the UE, a control message based on the UE capability message, the control message indicating a resource set that includes one or more resources for reference signal transmission from the at least two TRPs in accordance with the SFN configuration, the at least two TRPs including a first TRP and a second TRP. The operations of 2010 may be performed in accordance with examples as disclosed herein. In some examples, aspects of the operations of 2010 may be performed by a control message component 1430 as described with reference to FIG. 14.

At 2015, the method may include transmitting, to the UE in the one or more resources, a first reference signal of the first TRP and a second reference signal of the second TRP. The operations of 2015 may be performed in accordance with examples as disclosed herein. In some examples, aspects of the operations of 2015 may be performed by a reference signal transmission component 1435 as described with reference to FIG. 14.

At 2020, the method may include communicating with the UE using at least one of the first TRP and the second TRP in accordance with an SFN channel associated with the at least two TRPs. The operations of 2020 may be performed in accordance with examples as disclosed herein. In some examples, aspects of the operations of 2020 may be performed by a communication component 1440 as described with reference to FIG. 14.

Figure 21:
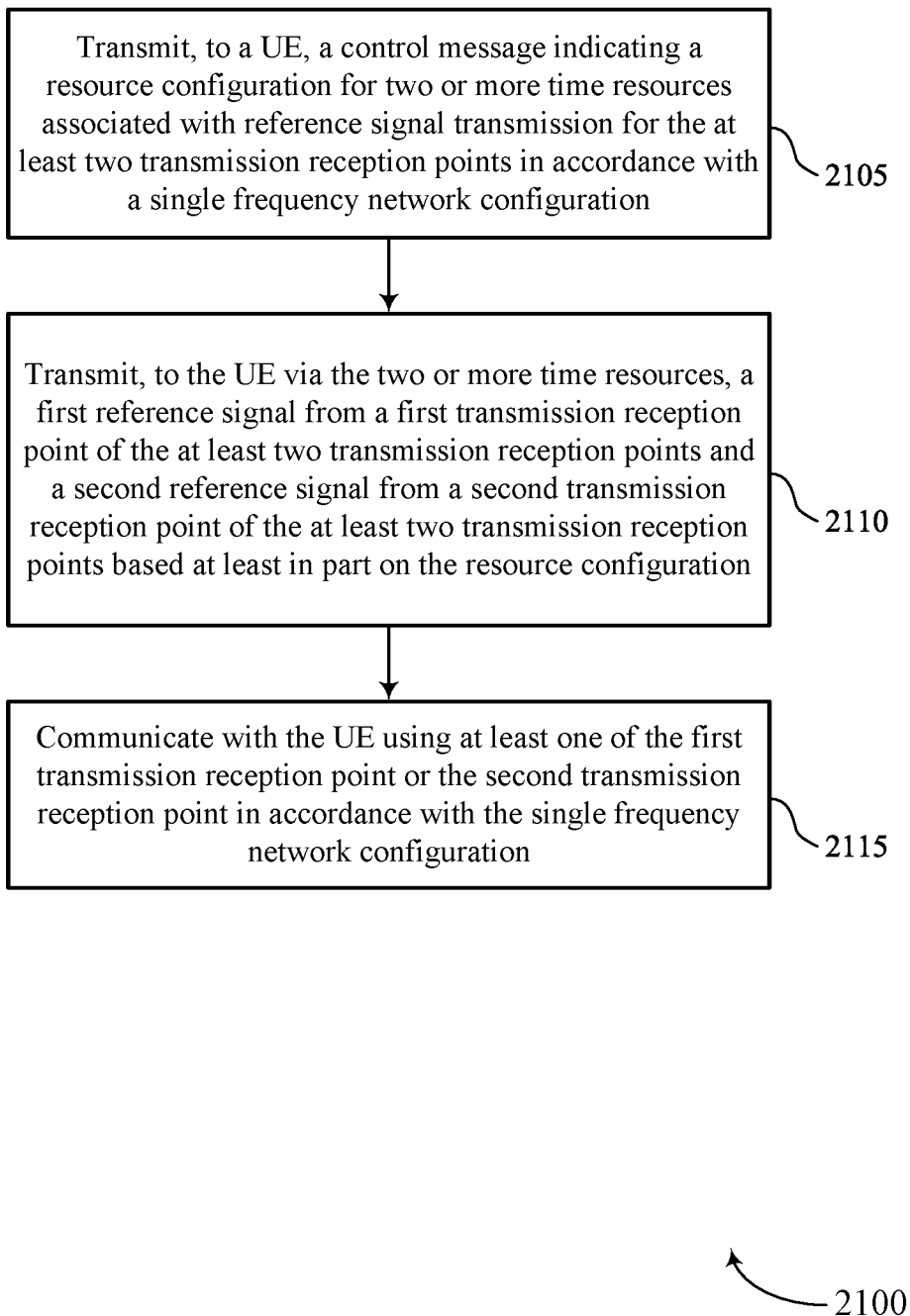

FIG. 21 shows a flowchart illustrating a method 2100 that supports TRS configuration for SFN communications in accordance with one or more aspects of the present disclosure. The operations of the method 2100 may be implemented by a network node or its components as described herein. For example, the operations of the method 2100 may be performed by a network node as described with reference to FIGS. 1 through 7 and 12 through 15. In some examples, a network node may execute a set of instructions to control the functional elements of the network node to perform the described functions. Additionally, or alternatively, the network node may perform aspects of the described functions using special-purpose hardware.

At 2105, the method may include transmitting, to a UE, a control message indicating a resource configuration for two or more time resources associated with reference signal transmission for the at least two TRPs in accordance with an SFN configuration. The operations of 2105 may be performed in accordance with examples as disclosed herein. In some examples, aspects of the operations of 2105 may be performed by a control message component 1430 as described with reference to FIG. 14.

At 2110, the method may include transmitting, to the UE via the two or more time resources, a first reference signal from a first TRP of the at least two TRPs and a second reference signal from a second TRP of the at least two TRPs based on the resource configuration. The operations of 2110 may be performed in accordance with examples as disclosed herein. In some examples, aspects of the operations of 2110 may be performed by a reference signal transmission component 1435 as described with reference to FIG. 14.

At 2115, the method may include communicating with the UE using at least one of the first TRP or the second TRP in accordance with the SFN configuration. The operations of 2115 may be performed in accordance with examples as disclosed herein. In some examples, aspects of the operations of 2115 may be performed by a communication component 1440 as described with reference to FIG. 14.

The following provides an overview of aspects of the present disclosure:

Aspect 1: A method for wireless communications at a UE, comprising: transmitting a UE capability message indicating support for an SFN configuration; receiving a control message based at least in part on the UE capability message, the control message indicating a resource set that comprises one or more resources for reference signal reception from at least two TRPs in accordance with the SFN configuration, the at least two TRPs comprising a first TRP and a second TRP; performing a channel estimation for an SFN channel associated with the at least two TRPs in accordance with the control message, the channel estimation based at least in part on a first reference signal of the first TRP and a second reference signal of the second TRP received in the one or more resources; and communicating with at least one of the first TRP or the second TRP in accordance with the channel estimation.

Aspect 2: The method of aspect 1, further comprising: receiving the first reference signal and the second reference signal in the one or more resources, the one or more resources comprising a first time resource associated with the first TRP and a second time resource associated with the second TRP, wherein the first time resource and the second time resource are overlapping in a time domain.

Aspect 3: The method of aspect 2, further comprising: receiving the first reference signal in the first time resource and a first resource element, and receiving the second reference signal in the second time resource and the first resource element.

Aspect 4: The method of any of aspects 2 through 3, wherein the first reference signal is scrambled according to a first scrambling sequence associated with a first ID of the first TRP; and the second reference signal is scrambled according to a second scrambling sequence associated with a second ID of the second TRP.

Aspect 5: The method of aspect 2, further comprising: receiving the first reference signal in the first time resource and a first resource element; and receiving the second reference signal in the second time resource and a second resource element that is nonoverlapping with the first resource element in a frequency domain.

Aspect 6: The method of any of aspects 2 and 5, wherein the first reference signal and the second reference signal are transmitted according to an FDM or an SDM configuration.

Aspect 7: The method of any of aspects 1 through 6, the resource set comprising a first resource set associated with the first TRP and a second resource set associated with the second TRP and the method further comprising: performing the channel estimation for the SFN channel based at least in part on the first reference signal being received via the first resource set, the second reference signal being received via the second resource set, and the first resource set corresponding to a same periodicity, a same offset, or both, as the second resource set.

Aspect 8: The method of any of aspects 1 through 6, the resource set comprising a first resource set associated with the first TRP and a second resource set associated with the second TRP and the method further comprising: receiving a first downlink control channel scheduling the first reference signal via the first resource set and a second downlink control channel scheduling the second reference signal via the second resource set; and performing the channel estimation for the SFN channel based at least in part on the first reference signal being received in a first time resource of the first resource set and the second reference signal being received in a second time resource of the second resource set that is overlapping with the first time resource in a time domain.

Aspect 9: The method of any of aspects 1 through 8, wherein the UE capability message comprises a field configured to indicate a UE capability to receive reference signals from the at least two TRPs in a same time resource in accordance with the SFN configuration.

Aspect 10: The method of aspect 9, wherein the UE capability message comprises one or more fields different than the field, the one or more fields indicating support for a multi-TRP communications configuration via a downlink control channel or a downlink shared channel.

Aspect 11: The method of any of aspects 1 through 8, further comprising: receiving the first reference signal via a first symbol and a first resource element; receiving the second reference signal via the first symbol and a second resource element, wherein the one or more resources comprises the first symbol, the first resource element, and the second resource element; and transmitting the UE capability message indicating support for the SFN configuration based at least in part on a frequency offset between the first resource element and the second resource element.

Aspect 12: A method for wireless communications at a UE, comprising: receiving a control message indicating a resource configuration for two or more time resources associated with reference signal reception from at least two TRPs in accordance with an SFN configuration; receiving, via the two or more time resources, a first reference signal from a first TRP of the at least two TRPs and a second reference signal from a second TRP of the at least two TRPs based at least in part on the resource configuration; performing a channel estimation for an SFN channel associated with the first TRP and the second TRP in accordance with the control message, the channel estimation based at least in part on the first reference signal and the second reference signal; and communicating with at least one of the first TRP or the second TRP in accordance with the channel estimation.

Aspect 13: The method of aspect 12, the control message indicating a window associated with the two or more time resources and the method further comprising: performing the channel estimation for the SFN channel based at least in part on the two or more time resources being located within the window, the two or more time resources comprising a first time resource associated with the first TRP and a second time resource associated with the second TRP.

Aspect 14: The method of aspect 13, wherein the control message indicates a starting boundary of the window relative to a location of the two or more time resources in a time domain.

Aspect 15: The method of aspect 13, further comprising: receiving the control message via a downlink control channel, the control message indicating a starting boundary of the window relative to a last symbol of the downlink control channel in a time domain.

Aspect 16: The method of any of aspects 13 through 15, further comprising: maintaining a first receiver chain associated with the first TRP and a second receiver chain associated with the second TRP, the first receiver chain corresponding to a first refresh interval and the second receiver chain corresponding to a second refresh interval, wherein a duration of the window is less than a duration of the first refresh interval and a duration of the second refresh interval.

Aspect 17: The method of any of aspects 13 through 16, further comprising: performing a beam switch during a beam switch duration between reception of the first reference signal and reception of the second reference signal, wherein a duration of the window is greater than the beam switch duration.

Aspect 18: The method of any of aspects 13 through 17, wherein the window comprises one or more resource sets associated with the two or more time resources, the one or more resource sets based at least in part on the control message, a periodicity of the two or more time resources, an offset, a capability of the UE, or any combination thereof.

Aspect 19: The method of any of aspects 13 through 18, further comprising: receiving an RRC signal indicating a configuration for the window.

Aspect 20: The method of any of aspects 12 through 19, wherein the resource configuration indicates a resource set comprising a first subset of resources associated with the first TRP and a second subset of resources associated with the second TRP, the control message indicating joint tracking between the first subset of resources and the second subset of resources.

Aspect 21: The method of aspect 20, further comprising: receiving a second control message indicating separate tracking between the first subset of resources and the second subset of resources; performing a first channel estimation for a first channel associated with the first TRP in accordance with the second control message; and performing a second channel estimation for a second channel associated with the second TRP in accordance with the second control message.

Aspect 22: The method of any of aspects 12 through 19, further comprising: receiving a control signal indicating a pairing between a first resource set associated with the first TRP and a second resource set associated with the second TRP; and performing the channel estimation for the SFN channel based at least in part on the control signal.

Aspect 23: The method of any of aspects 12 through 22, further comprising: receiving the first reference signal via a first time resource of the two or more time resources; and receiving the second reference signal via a second time resource of the two or more time resources that is nonoverlapping with the first time resource, the first reference signal and the second reference signal transmitted according to a TDM configuration.

Aspect 24: A method for wireless communications at a network node comprising at least two TRPs, the method comprising: receiving, from a UE, a UE capability message indicating support for an SFN configuration; transmitting, to the UE, a control message based at least in part on the UE capability message, the control message indicating a resource set that comprises one or more resources for reference signal transmission from the at least two TRPs in accordance with the SFN configuration, the at least two TRPs comprising a first TRP and a second TRP; transmitting, to the UE in the one or more resources, a first reference signal of the first TRP and a second reference signal of the second TRP; and communicating with the UE using at least one of the first TRP and the second TRP in accordance with an SFN channel associated with the at least two TRPs.

Aspect 25: The method of aspect 24, further comprising: transmitting the first reference signal and the second reference signal to the UE in the one or more resources, the one or more resources comprising a first time resource associated with the first TRP and a second time resource associated with the second TRP, wherein the first time resource and the second time resource are overlapping in a time domain.

Aspect 26: The method of aspect 25, further comprising: transmitting the first reference signal in the first time resource and a first resource element, the first reference signal scrambled according to a first scrambling sequence associated with the first TRP; and transmitting the second reference signal in the second time resource and the first resource element, the second reference signal scrambled according to a second scrambling sequence associated with the second TRP, the first time resource and the second time resource corresponding to a same symbol.

Aspect 27: The method of aspect 25, further comprising: transmitting the first reference signal in the first time resource and a first resource element; and transmitting the second reference signal in the second time resource and a second resource element that is nonoverlapping with the first resource element in a frequency domain, the first time resource and the second time resource corresponding to a same symbol, wherein the first reference signal and the second reference signal are transmitted according to an FDM or an SDM configuration.

Aspect 28: A method for wireless communications at a network node comprising at least two TRPs, the method comprising: transmitting, to a UE, a control message indicating a resource configuration for two or more time resources associated with reference signal transmission for the at least two TRPs in accordance with an SFN configuration; transmitting, to the UE via the two or more time resources, a first reference signal from a first TRP of the at least two TRPs and a second reference signal from a second TRP of the at least two TRPs based at least in part on the resource configuration; and communicating with the UE using at least one of the first TRP or the second TRP in accordance with the SFN configuration.

Aspect 29: The method of aspect 28, wherein the control message indicates a window associated with the two or more time resources.

Aspect 30: The method of aspect 29, wherein the control message indicates a starting boundary of the window relative to a location of the two or more time resources in a time domain.

Aspect 31: The method of aspect 29, further comprising: transmitting the control message via a downlink control channel, the control message indicating a starting boundary of the window relative to a last symbol of the downlink control channel in a time domain.

Aspect 32: The method of any of aspects 29 through 31, wherein a duration of the window is greater than a beam switch duration associated with a beam switch performed by the UE.

Aspect 33: An apparatus for wireless communications at a UE, comprising a processor; and memory coupled with the processor, the processor and memory configured to perform a method of any of aspects 1 through 11.

Aspect 34: An apparatus for wireless communications at a UE, comprising at least one means for performing a method of any of aspects 1 through 11.

Aspect 35: A non-transitory computer-readable medium storing code for wireless communications at a UE, the code comprising instructions executable by a processor to perform a method of any of aspects 1 through 11.

Aspect 36: An apparatus for wireless communications at a UE, comprising a processor; and memory coupled with the processor, the processor and memory configured to perform a method of any of aspects 12 through 23.

Aspect 37: An apparatus for wireless communications at a UE, comprising at least one means for performing a method of any of aspects 12 through 23.

Aspect 38: A non-transitory computer-readable medium storing code for wireless communications at a UE, the code comprising instructions executable by a processor to perform a method of any of aspects 12 through 23.

Aspect 39: An apparatus for wireless communications at a network node comprising at least two TRPs, the apparatus comprising a processor; and memory coupled with the processor, the processor and memory configured to perform a method of any of aspects 24 through 27.

Aspect 40: An apparatus for wireless communications at a network node comprising at least two TRPs, the apparatus comprising at least one means for performing a method of any of aspects 24 through 27.

Aspect 41: A non-transitory computer-readable medium storing code for wireless communications at a network node comprising at least two TRPs, the code comprising instructions executable by a processor to perform a method of any of aspects 24 through 27.

Aspect 42: An apparatus for wireless communications at a network node comprising at least two TRPs, the apparatus comprising a processor; and memory coupled with the processor, the processor and memory configured to perform a method of any of aspects 28 through 32.

Aspect 43: An apparatus for wireless communications at a network node comprising at least two TRPs, the apparatus comprising at least one means for performing a method of any of aspects 28 through 32.

Aspect 44: A non-transitory computer-readable medium storing code for wireless communications at a network node comprising at least two TRPs, the code comprising instructions executable by a processor to perform a method of any of aspects 28 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor; and
   memory coupled with the processor, the processor and memory configured to:
   transmit a UE capability message indicating support for a single frequency network configuration;
   receive a control message based at least in part on the UE capability message, the control message indicating a resource set that comprises one or more resources for reference signal reception from at least two transmission reception points in accordance with the single frequency network configuration, the at least two transmission reception points comprising a first transmission reception point and a second transmission reception point;
   perform a channel estimation for a single frequency network channel associated with the at least two transmission reception points in accordance with the control message, the channel estimation based at least in part on a first reference signal of the first transmission reception point and a second reference signal of the second transmission reception point received in the one or more resources; and
   communicate with at least one of the first transmission reception point or the second transmission reception point in accordance with the channel estimation.

2. The apparatus of claim 1, wherein the processor and memory are further configured to:
   receive the first reference signal and the second reference signal in the one or more resources, the one or more resources comprising a first time resource associated with the first transmission reception point and a second time resource associated with the second transmission reception point, wherein the first time resource and the second time resource are overlapping in a time domain.

3. The apparatus of claim 2, wherein the processor and memory are further configured to:
   receive the first reference signal in the first time resource and a first resource element, the first reference signal scrambled according to a first scrambling sequence associated with a first identifier of the first transmission reception point; and
   receive the second reference signal in the second time resource and the first resource element, the second reference signal scrambled according to a second scrambling sequence associated with a second identifier of the second transmission reception point.

4. The apparatus of claim 2, wherein the processor and memory are further configured to:
   receive the first reference signal in the first time resource and a first resource element; and
   receive the second reference signal in the second time resource and a second resource element that is non-overlapping with the first resource element in a frequency domain, wherein the first reference signal and the second reference signal are transmitted according to a frequency division multiplexing or a spatial division multiplexing configuration.

5. The apparatus of claim 1, the resource set comprising a first resource set associated with the first transmission reception point and a second resource set associated with the second transmission reception point, wherein the processor and memory further configured to:
   perform the channel estimation for the single frequency network channel based at least in part on the first reference signal being received via the first resource set, the second reference signal being received via the second resource set, and the first resource set corresponding to a same periodicity, a same offset, or both, as the second resource set.

6. The apparatus of claim 1, the resource set comprising a first resource set associated with the first transmission reception point and a second resource set associated with the second transmission reception point, wherein the processor and memory are further configured to:
   receive a first downlink control channel scheduling the first reference signal via the first resource set and a second downlink control channel scheduling the second reference signal via the second resource set; and
   perform the channel estimation for the single frequency network channel based at least in part on the first reference signal being received in a first time resource of the first resource set and the second reference signal being received in a second time resource of the second resource set that is overlapping with the first time resource in a time domain.

7. The apparatus of claim 1, wherein the UE capability message comprises a field configured to indicate a UE capability to receive reference signals from the at least two transmission reception points in a same time resource in accordance with the single frequency network configuration.

8. The apparatus of claim 7, wherein the UE capability message comprises one or more fields different than the field, the one or more fields indicating support for a multi-transmission reception point communications configuration via a downlink control channel or a downlink shared channel.

9. The apparatus of claim 1, wherein the processor and memory are further configured to:
receive the first reference signal via a first symbol and a first resource element;
receive the second reference signal via the first symbol and a second resource element, wherein the one or more resources comprises the first symbol, the first resource element, and the second resource element; and
transmit the UE capability message indicating the support for the single frequency network configuration based at least in part on a frequency offset between the first resource element and the second resource element.

10. An apparatus for wireless communications at a user equipment (UE), comprising:
a processor; and
memory coupled with the processor, the processor and memory configured to:
receive a control message indicating a resource configuration for two or more time resources associated with reference signal reception from at least two transmission reception points in accordance with a single frequency network configuration;
receive, via the two or more time resources, a first reference signal from a first transmission reception point of the at least two transmission reception points and a second reference signal from a second transmission reception point of the at least two transmission reception points based at least in part on the resource configuration;
perform a channel estimation for a single frequency network channel associated with the first transmission reception point and the second transmission reception point in accordance with the control message, the channel estimation based at least in part on the first reference signal and the second reference signal; and
communicate with at least one of the first transmission reception point or the second transmission reception point in accordance with the channel estimation.

11. The apparatus of claim 10, the control message indicating a window associated with the two or more time resources, wherein the processor and memory are further configured to:
perform the channel estimation for the single frequency network channel based at least in part on the two or more time resources being located within the window, the two or more time resources comprising a first time resource associated with the first transmission reception point and a second time resource associated with the second transmission reception point.

12. The apparatus of claim 11, wherein the control message indicates a starting boundary of the window relative to a location of the two or more time resources in a time domain.

13. The apparatus of claim 11, wherein the processor and memory are further configured to:
receive the control message via a downlink control channel, the control message indicating a starting boundary of the window relative to a last symbol of the downlink control channel in a time domain.

14. The apparatus of claim 11, wherein the processor and memory are further configured to:
maintain a first receiver chain associated with the first transmission reception point and a second receiver chain associated with the second transmission reception point, the first receiver chain corresponding to a first refresh interval and the second receiver chain corresponding to a second refresh interval, wherein a duration of the window is less than a duration of the first refresh interval and a duration of the second refresh interval.

15. The apparatus of claim 11, wherein the processor and memory are further configured to:
perform a beam switch during a beam switch duration between reception of the first reference signal and reception of the second reference signal, wherein a duration of the window is greater than the beam switch duration.

16. The apparatus of claim 11, wherein the window comprises one or more resource sets associated with the two or more time resources, the one or more resource sets based at least in part on the control message, a periodicity of the two or more time resources, an offset, a capability of the UE, or any combination thereof.

17. The apparatus of claim 11, wherein the processor and memory are further configured to:
receive a radio resource control signal indicating a configuration for the window.

18. The apparatus of claim 10, wherein the resource configuration indicates a resource set comprising a first subset of resources associated with the first transmission reception point and a second subset of resources associated with the second transmission reception point, the control message indicating joint tracking between the first subset of resources and the second subset of resources.

19. The apparatus of claim 18, wherein the processor and memory are further configured to:
receive a second control message indicating separate tracking between the first subset of resources and the second subset of resources;
perform a first channel estimation for a first channel associated with the first transmission reception point in accordance with the second control message; and
perform a second channel estimation for a second channel associated with the second transmission reception point in accordance with the second control message.

20. The apparatus of claim 10, wherein the processor and memory are further configured to:
receive a control signal indicating a pairing between a first resource set associated with the first transmission reception point and a second resource set associated with the second transmission reception point; and
perform the channel estimation for the single frequency network channel based at least in part on the control signal.

21. The apparatus of claim 10, wherein the processor and memory are further configured to:
receive the first reference signal via a first time resource of the two or more time resources; and
receive the second reference signal via a second time resource of the two or more time resources that is non-overlapping with the first time resource, the first reference signal and the second reference signal transmitted according to a time division multiplexing configuration.

22. An apparatus for wireless communications at a network node, comprising:
at least two transmission reception points;
a processor; and
memory coupled with the processor, the processor and memory configured to:
receive, from a user equipment (UE), a UE capability message indicating support for a single frequency network configuration;

transmit, to the UE, a control message based at least in part on the UE capability message, the control message indicating a resource set that comprises one or more resources for reference signal transmission from the at least two transmission reception points in accordance with the single frequency network configuration, the at least two transmission reception points comprising a first transmission reception point and a second transmission reception point;

transmit, to the UE in the one or more resources, a first reference signal of the first transmission reception point and a second reference signal of the second transmission reception point; and communicate with the UE using at least one of the first transmission reception point and the second transmission reception point in accordance with a single frequency network channel associated with the at least two transmission reception points.

23. The apparatus of claim 22, wherein the processor and memory are further configured to:

transmit the first reference signal and the second reference signal to the UE in the one or more resources, the one or more resources comprising a first time resource associated with the first transmission reception point and a second time resource associated with the second transmission reception point, wherein the first time resource and the second time resource are overlapping in a time domain.

24. The apparatus of claim 23, wherein the processor and memory are further configured to:

transmit the first reference signal in the first time resource and a first resource element, the first reference signal scrambled according to a first scrambling sequence associated with the first transmission reception point; and transmit the second reference signal in the second time resource and the first resource element, the second reference signal scrambled according to a second scrambling sequence associated with the second transmission reception point, the first time resource and the second time resource corresponding to a same symbol.

25. The apparatus of claim 23, wherein the processor and memory are further configured to:

transmit the first reference signal in the first time resource and a first resource element; and transmit the second reference signal in the second time resource and a second resource element that is non-overlapping with the first resource element in a frequency domain, the first time resource and the second time resource corresponding to a same symbol, wherein the first reference signal and the second reference signal are transmitted according to a frequency division multiplexing or a spatial division multiplexing configuration.

26. An apparatus for wireless communications at a network node, comprising:

at least two transmission reception points;

a processor; and memory coupled with the processor, the processor and memory configured to:

transmit, to a user equipment (UE), a control message indicating a resource configuration for two or more time resources associated with reference signal transmission for the at least two transmission reception points in accordance with a single frequency network configuration;

transmit, to the UE via the two or more time resources, a first reference signal from a first transmission reception point of the at least two transmission reception points and a second reference signal from a second transmission reception point of the at least two transmission reception points based at least in part on the resource configuration; and communicate with the UE using at least one of the first transmission reception point or the second transmission reception point in accordance with the single frequency network configuration.

27. The apparatus of claim 26, wherein the control message indicates a window associated with the two or more time resources.

28. The apparatus of claim 27, wherein the control message indicates a starting boundary of the window relative to a location of the two or more time resources in a time domain.

29. The apparatus of claim 27, wherein the processor and memory are further configured to:

transmit the control message via a downlink control channel, the control message indicating a starting boundary of the window relative to a last symbol of the downlink control channel in a time domain.

30. The apparatus of claim 27, wherein a duration of the window is greater than a beam switch duration associated with a beam switch performed by the UE.

* * * * *